United States Patent
Tian et al.

(10) Patent No.: US 9,232,524 B2
(45) Date of Patent: Jan. 5, 2016

(54) MULTIPLE ACCESS SCHEME FOR MULTI-CHANNELS OF A NETWORK WITH A LIMITED LINK BUDGET

(71) Applicant: QUALCOMM Incorporated, San Diego, CA (US)

(72) Inventors: Bin Tian, San Diego, CA (US); Alok K. Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 13/734,942

(22) Filed: Jan. 5, 2013

(65) Prior Publication Data

US 2014/0192659 A1 Jul. 10, 2014

(51) Int. Cl.
*H04W 72/04* (2009.01)
*H04W 4/00* (2009.01)
*H04W 72/08* (2009.01)

(52) U.S. Cl.
CPC .......... *H04W 72/0453* (2013.01); *H04W 4/005* (2013.01); *H04W 72/08* (2013.01)

(58) Field of Classification Search
CPC ............ H04J 3/00; H04J 3/1694; H04Q 7/20; H04W 24/00; H04W 36/34; H04W 4/00; H04W 52/02; H04W 52/04; H04W 52/22; H04W 72/04; H04W 72/08; H04W 74/00; H04W 74/08; H04W 4/005; H04W 52/0229; H04W 52/0219; H04W 52/0216; H04W 68/00; H04W 68/02; H04W 72/0406; H04W 72/0446; H04W 72/0453; H04L 1/0002; H04L 1/189; H04L 1/1858; H04L 1/1825; H04L 5/0094; H04L 67/125

USPC ................. 370/230, 248–252, 277, 328–336; 455/436, 450–466, 522, 63.1
See application file for complete search history.

(56) References Cited

U.S. PATENT DOCUMENTS

| | | | |
|---|---|---|---|
| 7,336,969 B2 | 2/2008 | Minnick et al. | |
| 7,346,356 B2 | 3/2008 | Emami et al. | |
| 7,890,133 B2 | 2/2011 | Qi et al. | |
| 7,953,040 B2 | 5/2011 | Harikumar et al. | |
| 2010/0027502 A1* | 2/2010 | Chen et al. | 370/330 |
| 2010/0238881 A1 | 9/2010 | Hou et al. | |
| 2012/0026896 A1* | 2/2012 | Li et al. | 370/248 |

(Continued)

FOREIGN PATENT DOCUMENTS

WO 2006004968 A2 1/2006

OTHER PUBLICATIONS

International Search Report and Written Opinion—PCT/US2013/077069—ISA/EPO—Apr. 23, 2014.

*Primary Examiner* — Charles C Jiang
*Assistant Examiner* — Wali Butt
(74) *Attorney, Agent, or Firm* — Michael J. DeHaemer, Jr.; Jeff Jacobs

(57) ABSTRACT

Methods, systems, and devices are described for managing wireless communications in a machine-to-machine (M2M) wireless Wide Area Network (WAN). An operating frequency band of the M2M wireless WAN is divided into at least a first frequency channel and a second frequency channel. The first and second frequency channels being used for communications on a reverse link. A first rise over thermal (RoT) threshold is set for the first frequency channel. A second RoT threshold is set for the second frequency channel. The second RoT threshold is lower than the first RoT threshold.

31 Claims, 19 Drawing Sheets

(56) References Cited

U.S. PATENT DOCUMENTS

| | | |
|---|---|---|
| 2012/0163213 A1 | 6/2012 | Sanderford, Jr. |
| 2012/0195216 A1* | 8/2012 | Wu et al. ................ 370/252 |
| 2012/0230302 A1* | 9/2012 | Calcev et al. ............ 370/336 |
| 2012/0275321 A1* | 11/2012 | Ruvalcaba et al. ........... 370/252 |
| 2012/0275439 A1* | 11/2012 | Bhushan et al. ............. 370/336 |
| 2012/0329399 A1* | 12/2012 | Tokgoz et al. ............... 455/63.1 |
| 2013/0265984 A1* | 10/2013 | Li et al. ........................ 370/330 |

* cited by examiner

Time t1

Time t2

MULTIPLE ACCESS SCHEME FOR MULTI-CHANNELS OF A NETWORK WITH A LIMITED LINK BUDGET

BACKGROUND

The following relates generally to wireless communication, and more specifically to communications in a machine-to-machine (M2M) wireless wide area network (WAN). Wireless communications systems are widely deployed to provide various types of communication content such as voice, video, packet data, messaging, broadcast, sensor data, tracking data, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple devices. In some examples, these devices may be sensors and/or meters configured to collect data and transmit this data to an end server via a base station. These sensors and/or meters may be referred to as M2M devices. Base stations may communicate with M2M devices on forward and reverse links. Each base station has a coverage range, which may be referred to as the coverage area of the cell. An M2M device may transmit data to a base station on the reverse link.

When an M2M device transmits data on the reverse link, it adds to the total interference on the reverse link. Since the reverse link transmissions might be high speed in nature, the spreading factors may be low, the coding gain may be low, and the power required by the M2M device to perform these transmissions may be high. The resulting interference might create communication problems on the reverse link. As a result, an acceptable noise and interference threshold may be set. This may represent the amount of interference that can be added to the reverse link without causing the interference to become too high to decode information received from M2M devices. Traditional approaches, however, set a single threshold for the various frequency channels of the reverse link. If the threshold is set too high, M2M devices with a larger path loss may not be able to effectively transmit communications on the reverse link. If the threshold is set to low, the capacity the frequency channels is diminished.

SUMMARY

The described features generally relate to one or more improved methods, systems and devices to set an appropriate threshold for M2M devices communicating in an M2M wireless WAN without sacrificing the capacity of the network. The threshold may be set above the thermal noise level that exists in a frequency channel. As a result, the threshold may be referred to herein as a rise over thermal (RoT) threshold. In one configuration, the base station may set a RoT threshold for each frequency channel. At least one of these frequency channels may be dedicated as a low data rate random access channel. The frequency channel dedicated to be the low data rate random access channel may have a low RoT threshold as compared to the RoT threshold set for the other frequency channels. As a result, the capacity of this frequency channel may be low and may be reserved for M2M devices with a larger path loss because they are located further away from the base station. The other frequency channels, however, may maintain a higher RoT threshold, which will increase the capacity of these channels.

Methods, systems, and devices are described for managing wireless communications in a machine-to-machine (M2M) wireless Wide Area Network (WAN). An operating frequency band of the M2M wireless WAN is divided into at least a first frequency channel and a second frequency channel. The first and second frequency channels being used for communications on a reverse link. A first rise over thermal (RoT) threshold is set for the first frequency channel. A second RoT threshold is set for the second frequency channel. The second RoT threshold is lower than the first RoT threshold.

In one embodiment, a first group of one or more M2M devices, from a plurality of M2M devices, may be identified. The first group of the one or more M2M devices may be used to transmit on the reverse link using the first frequency channel. In addition, a second group of one or more M2M devices, from the plurality of M2M devices, may be identified to transmit on the reverse link using the second frequency channel.

A channel assignment message may be broadcasted to the first group and second group of M2M devices. The channel assignment message may inform the first group of one or more M2M devices to transmit on the reverse link using the first frequency channel, and the channel assignment message may inform the second group of one or more M2M devices to transmit on the reverse link using the second frequency channel.

Identifying the first group and second group of one or more M2M devices may include identifying one or more M2M devices, from the plurality of M2M devices, located within a first geographical area, identifying one or more M2M devices, from the plurality of M2M devices, located within a second geographical area. The one or more M2M devices located within the first geographical area may be assigned to the first frequency channel with the first RoT threshold. The one or more M2M devices located within the second geographical area may be assigned to the second frequency channel with the second RoT threshold. The second geographical area may have a larger path loss from a device communicating with the M2M devices on a forward link than the first geographical area.

In one configuration, identifying the first group and second group of one or more M2M devices may include identifying one or more M2M devices, from the plurality of M2M devices, that have previously transmitted on the reverse link at a data rate that satisfies a data rate threshold. Identifying the first and second group of M2M devices may also include identifying one or more M2M devices, from the plurality of M2M devices, that have previously transmitted on the reverse link at a data rate that fails to satisfy the data rate threshold.

The one or more M2M devices that have previously transmitted on the reverse link at a data rate that satisfies the data rate threshold may be assigned to the first frequency channel with the first RoT threshold. The one or more M2M devices that have previously transmitted on the reverse link at a data rate that fails to satisfy the data rate threshold may be assigned to the second frequency channel with the second RoT threshold.

In one embodiment, identifying the first group and second group of one or more M2M devices may include estimating a strength of a forward link received at one or more of the M2M devices of the plurality of M2M device. The first group of one or more M2M devices may be assigned to the first frequency channel with the first RoT threshold, and the second group of one or more M2M devices may be assigned to the second frequency channel with the second RoT threshold. The estimated strength of the forward link received at the second group may be lower than the estimated strength of the forward link received at the first group.

In one embodiment, a determination may be made as to whether to adjust the first or second RoT thresholds for the first or second frequency channels. The determination to adjust the first or second RoT thresholds is based at least in part on a change of a number of M2M devices using the first or second frequency channels to communicate on the reverse link. In one configuration, the first RoT threshold of the first frequency channel may be dynamically lowered upon determining the number of M2M devices using the first frequency channel has decreased. The first RoT threshold of the first frequency channel may be dynamically increased upon determining the number of M2M devices using the first frequency channel has increased.

In one configuration, code division multiple access (CDMA) may be implemented for communications on the reverse link using the first and second frequency channels. An RoT threshold may represent a quantity of signal interference on a frequency channel that is above a thermal noise of the frequency channel.

A base station configured for wireless communication in a machine-to-machine (M2M) wireless Wide Area Network (WAN) is also described. The base station may include a processor and memory in electronic communication with the processor. Instructions may be stored in the memory. The instructions may be executable by the processor to divide an operating frequency band of the M2M wireless WAN into at least a first frequency channel and a second frequency channel. The first and second frequency channels being used for communications on a reverse link. The instructions may also be executable by the processor to set a first rise over thermal (RoT) threshold for the first frequency channel, and set a second RoT threshold for the second frequency channel. The second RoT threshold may be lower than the first RoT threshold.

An apparatus configured for wireless communication in a machine-to-machine (M2M) wireless Wide Area Network (WAN) is also described. The apparatus may include means for dividing an operating frequency band of the M2M wireless WAN into at least a first frequency channel and a second frequency channel. The first and second frequency channels may be used for communications on a reverse link. The apparatus may also include means for setting a first rise over thermal (RoT) threshold for the first frequency channel, and means for setting a second RoT threshold for the second frequency channel. The second RoT threshold may be lower than the first RoT threshold.

A computer program product for managing wireless communication in a machine-to-machine (M2M) wireless Wide Area Network (WAN) is also described. The computer program product may include a non-transitory computer-readable medium storing instructions executable by the processor to divide an operating frequency band of the M2M wireless WAN into at least a first frequency channel and a second frequency channel. The first and second frequency channels may be used for communications on a reverse link. The instructions may also be executable by the processor to set a first rise over thermal (RoT) threshold for the first frequency channel, and set a second RoT threshold for the second frequency channel. The second RoT threshold may be lower than the first RoT threshold.

A method for wireless communication on a reverse link in a machine-to-machine (M2M) wireless Wide Area Network (WAN) is also described. A first frequency channel and a second frequency channel to use for communications on the reverse link may be identified. The first frequency channel may include a first rise over thermal (RoT) threshold. The second frequency channel may include a second RoT threshold. The second RoT threshold may be lower than the first RoT threshold. Communications may occur on the reverse link using the first frequency channel or the second frequency channel.

In one embodiment, a broadcast of a channel assignment message is received. The message may indicate whether to use the first frequency channel or the second frequency channel for communications on the reverse link. The first frequency channel or the second frequency channel may be selected to use for communications on the reverse link. Selecting the first or second frequency channel may include transmitting data at a first data rate using the first frequency channel, monitoring for an acknowledgment (ACK) message indicating successful transmission of the data at the first data rate, and upon failing to receive the ACK message, retransmitting the data at a second data rate using the second frequency channel. The second data rate may be lower than the first data rate.

In one embodiment, selecting the first or second frequency channel may include estimating a signal strength of a forward link originating from a base station, and selecting the first frequency channel or the second frequency channel based at least in part on the estimated signal strength of the forward link.

In one configuration, selecting the first or second frequency channel may include receiving a frequency channel capacity message. The message may indicate an available capacity for the first frequency channel and the second frequency channel. The first frequency channel or the second frequency channel may be selected based at least in part on the available capacity of each channel indicated by the message.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In one embodiment, a network may be limited by a link budget. A link budget is the accounting of the gains and losses from a transmitter (e.g., an M2M device), through a communications medium, to a receiver (e.g., a base station). If the link budget of a network (e.g., an M2M wireless WAN) is limited, the use of code division multiple access (CDMA) to allow multiple devices access to the same frequency channel to transmit on the reverse link may result in the operating RoT of the channel adversely affecting the link budget of the reverse link. If, however, the network is operated at a low RoT in order to minimize the RoT impact on the coverage of the network, the capacity on the reverse link may be drastically reduced. In one embodiment, the link budget of a network may be limited due to limited power of devices in the network (e.g., M2M devices) and/or a larger cell size.

The present systems and methods are described to set an appropriate RoT threshold for frequency channels used by M2M devices communicating in an M2M wireless WAN, without sacrificing the capacity of the network. In one configuration, a base station may divide an operating frequency band of the network into multiple reverse link frequency channels. The base station may also set a RoT threshold for each frequency channel. At least one of these frequency channels may maintain a relatively low RoT, and may be used as a low data rate random access channel. For example, the RoT threshold for this channel may be 1 dB or less. This frequency channel may also be link budget friendly to M2M devices that transmit at low data rates on the reverse link. The RoT thresholds may be dynamically altered and the base station may instruct the M2M devices which they should use. The M2M devices may also determine which frequency channel to use based on the strength of a signal received from the base station.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
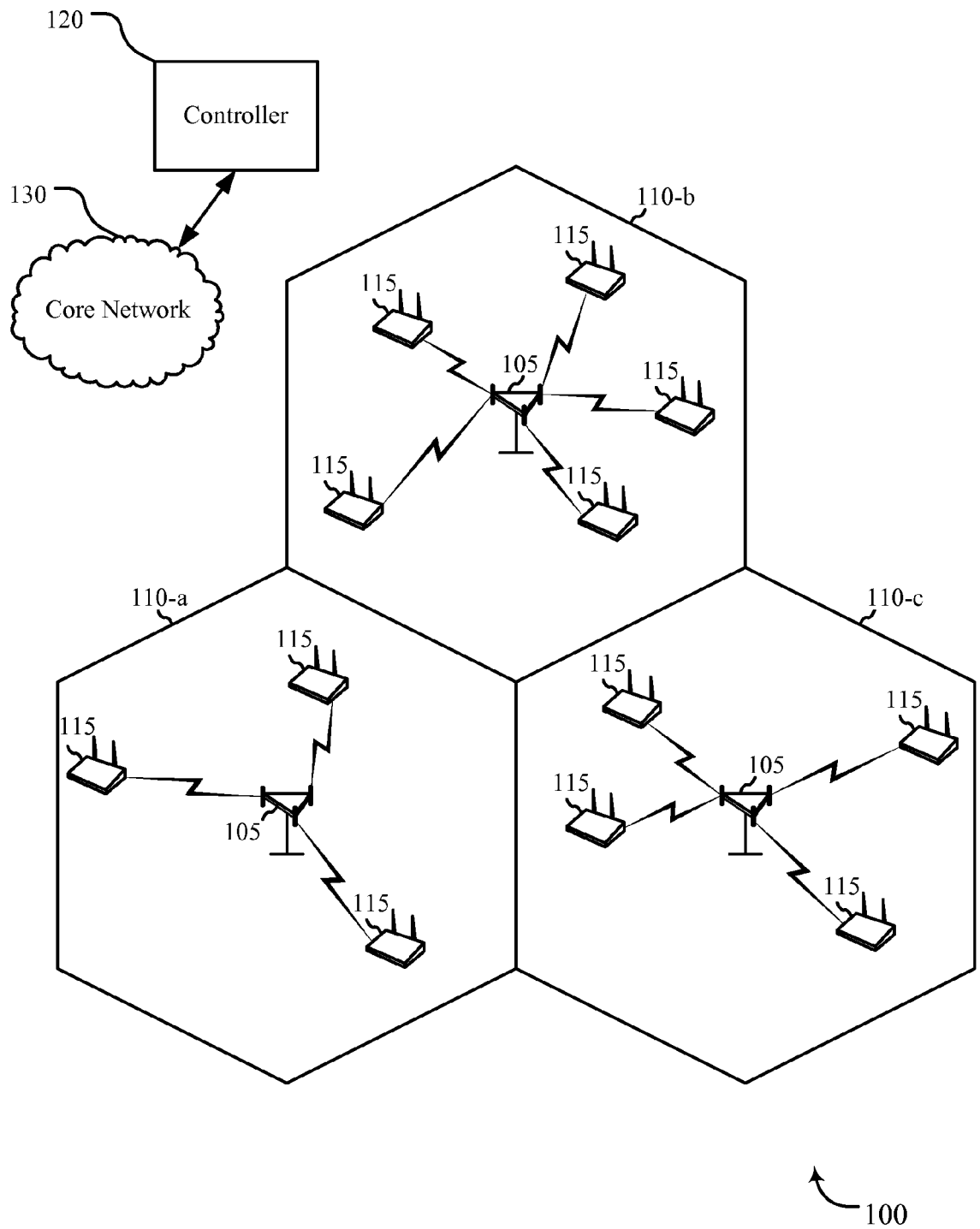
FIG. 1 shows a block diagram of a wireless communications system.

Referring first to FIG. 1, a block diagram illustrates an example of a wireless communications system 100. The system 100 includes base stations 105 (or cells), machine-to-machine (M2M) devices 115, a base station controller 120, and a core network 130 (the controller 120 may be integrated into the core network 130). The system 100 may support operation on multiple carriers (waveform signals of different frequencies).

The base stations 105 may wirelessly communicate with the M2M devices 115 via a base station antenna (not shown). The base stations 105 may communicate with the M2M devices 115 under the control of the base station controller 120 via multiple carriers. Each of the base station 105 sites may provide communication coverage for a respective geographic area. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 10 km in radius), and a femto base station may provide communication coverage for a relatively smaller geographic area (e.g., 1 km in radium). There may be overlapping coverage areas for different technologies.

The M2M devices 115 may be dispersed throughout the coverage areas 110. Each M2M device 115 may be stationary or mobile. In one configuration, the M2M devices 115 may be able to communicate with different types of base stations such as, but not limited to, macro base stations, pico base stations, and femto base stations. The M2M devices 115 may be sensors and/or meters that monitor and/or track other devices, environmental conditions, etc. The information collected by the M2M devices 115 may be transmitted across a network that includes a base station 105 to a back-end system, such as a server. The transmission of data to/from the M2M devices 115 may be routed through the base stations 105. The base stations 105 may communicate with the M2M devices on a forward link. In one configuration, the base stations 105 may generate a forward link frame with a number of time slots that include channels to carry data and/or messages to an M2M device 115. In one example, each forward link frame may include no more than three time slots and one or more corresponding channels. These slots and channels may include a paging slot with a paging channel, an acknowledgment (ACK) slot with an ACK channel, and a traffic slot with a traffic channel. The length of an individual forward link frame may be short (e.g., 20 milliseconds (ms)). In one embodiment, four frames may be joined to form a larger frame with a duration of 80 ms. Each frame included in the larger frame may include no more than three time slots and channels such as the paging slot for the paging channel, the ACK slot for the ACK channel, and the traffic slot for the traffic channel. The paging and ACK slots of each frame may each have a length of 5 ms while the traffic slot of each frame may have a length of 10 ms. An M2M device 115 may wake up during the individual frames (within the larger frame) that include data and/or messages on its channels that are intended for that M2M device 115.

In one configuration, an M2M device 115 may transmit data to a base station 105 during an uplink slot of a frame. The length of the uplink slot may be 20 ms. The M2M device 115 may transmit a data packet using a frequency channel. The frequency channel may cover a portion of the frequencies of the operating band used for communications with the base station 105. The frequency channel may include a particular RoT threshold, set by the base station 105. The M2M device 115 may use the frequency channel to carry the data packet on the reverse link based in part on the RoT threshold of that channel. The M2M device 115 may use a frequency channel with a high RoT threshold if there is sufficient signal strength on the forward link for communications received from the base station. A high RoT threshold may allow for more M2M devices 115 to use that channel and may allow for a transmissions at a high data rate. The M2M device 115 may use a frequency channel with a low RoT threshold if a weak signal exists on the forward link. The low RoT threshold may reduce the capacity of this channel and transmissions may be sent on this channel at a low data rate.

In one embodiment, M2M devices 115 may be incorporated in other devices or the M2M devices 115 may be standalone devices. For example, devices such as cellular phones and wireless communications devices, personal digital assistants (PDAs), other handheld devices, netbooks, notebook computers, surveillance cameras, handled medical scanning devices, home appliances, etc. may include one or more M2M devices 115.

In one example, the network controller 120 may be coupled to a set of base stations and provide coordination and control for these base stations 105. The controller 120 may communicate with the base stations 105 via a backhaul (e.g., core network 125). The base stations 105 may also communicate with one another directly or indirectly and/or via wireless or wireline backhaul.

Figure 2:
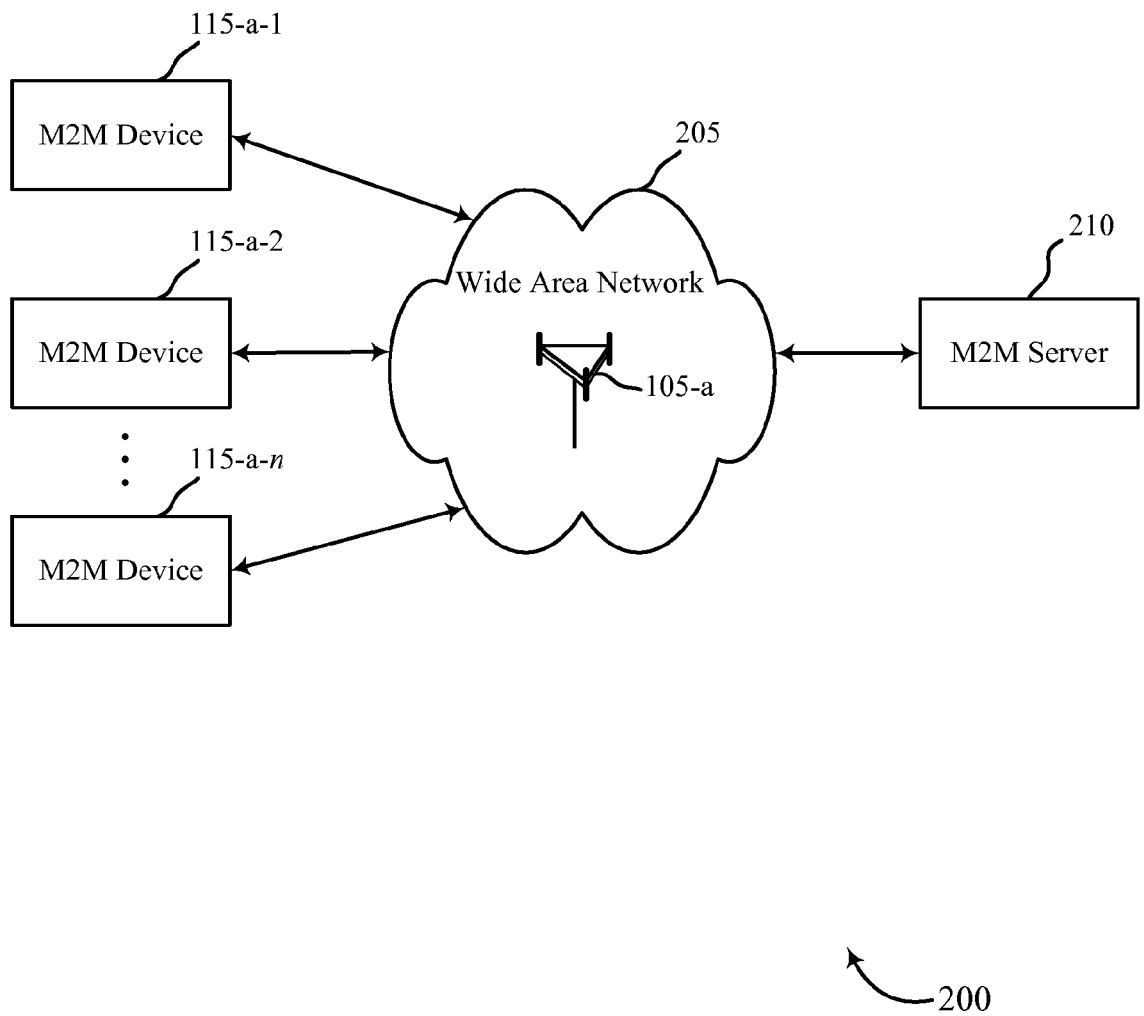
FIG. 2 illustrates an example of a wireless communication system including a wireless wide area network (WAN) implementing M2M communications.

FIG. 2 illustrates an example of a wireless communication system 200 including a wireless wide area network (WAN) 205 implementing an M2M service according to one aspect. The system 200 may include a number of M2M devices 115-a and an M2M server 210. Communications between the server 210 and M2M devices 115 may be routed through a base station 105, which may be considered part of the WAN 205. The base station 105-a may be an example of the base stations illustrated in FIG. 1. The M2M devices 115-a may be examples of the M2M devices 115 illustrated in FIG. 1. One skilled in the art would understand that the quantity of M2M devices 115-a, WANs 205, and M2M servers 210 shown in FIG. 2 is for illustration purposes only and should not be construed as limiting.

The wireless communication system 200 may be operable to facilitate M2M communications. M2M communications may include communications between one or more devices without human intervention. In one example, M2M communications may include the automated exchange of data between a remote machine, such as an M2M device 115-a, and a back-end IT infrastructure, such as the M2M server 210, without user intervention. The transfer of data from an M2M device 115-a to the M2M server 210 via the WAN 205 (e.g., the base station 105-a) may be performed using reverse link communications. Data collected by the M2M devices 115-a (e.g., monitoring data, sensor data, meter data, etc.) may be transferred to the M2M server 210 on the reverse link communications.

The transfer of data from the M2M server 210 to an M2M device 115-a via the base station 105-a may be performed via forward link communications. The forward link may be used to send instructions, software updates, traffic data, and/or messages to the M2M devices 115-a. The instructions may instruct the M2M devices 115-a to remotely monitor equipment, environmental conditions, etc. M2M communications may be used with various applications such as, but not limited to, remote monitoring, measurement and condition recording, fleet management and asset tracking, in-field data collection, distribution, and storage, etc. The base station 105-a may generate one or more forward link frames with a small number of time slots with channels to transmit instructions, software updates, and/or messages. The various M2M devices 115-a may wake up during the time slots of a specific frame when instructions or other data is included on a channel during the time slots of that frame. The devices 115-a may become aware that instructions or other data are available by decoding a paging message during a paging slot of a frame. A paging cycle may indicate how often the base station 105-a should transmit a paging message to an M2M device 115-a. The device 115-a may wake up during a paging slot to monitor for a paging message according to the paging cycle. The paging messages may be transmitted at different data rates, depending on the signal strength of the M2M device 115-a.

In one configuration, different types of M2M communications may be proposed in different wireless access networks that use different addressing formats. Different addressing formats may lead to different types of M2M devices 115-a being used for different services. In one aspect, an M2M network may be implemented which may maintain the M2M devices 115-a independent of the WAN technology that is used to communicate with the M2M server 210. In such an aspect, the M2M devices 115-a and the M2M server 210 may be made independent of the WAN technology that is used. As a result, a WAN technology used for backhaul communication may be replaced with a different WAN technology, without affecting the M2M devices 115-a that may already be installed. For example, the M2M server 210 and an M2M device 115-a may communicate with each other irrespective of the addressing format used by the WAN technology since the addressing format used by the M2M device 115-a may not be tied with the addressing used by the implemented WAN technology.

In one embodiment, the behavior of the M2M devices 115-a may be pre-defined. For example, the day, time, etc. to monitor another device and transmit the collected information may be pre-defined for an M2M device 115-a. For example, the M2M device 115-a-1 may be programmed to begin monitoring another device and collect information about that other device at a first pre-defined time period. The device 115-a-1 may also be programmed to transmit the collected information at a second pre-defined time period. The behavior of an M2M device 115-a may be remotely programmed to the device 115-a.

Figure 3A:
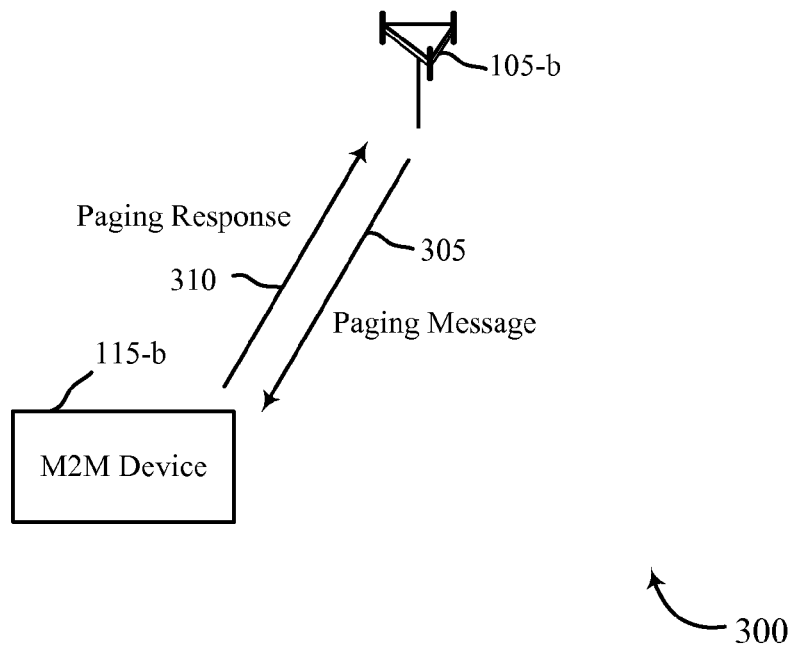
FIG. 3A shows a block diagram illustrating one embodiment of a paging system.

FIG. 3A is a block diagram illustrating one embodiment of a paging system 300 including a base station 105-b and an M2M device 115-b. The base station 105-b may be an example of the base stations 105 of FIG. 1 or 2. The M2M device 115-b may be an example of the M2M devices 115 of FIG. 1 or 2.

In a wireless communication system, such as the systems of FIG. 1 or 2, the notions of sleep state and paging are important to provide network connectivity to a large population of devices (e.g., M2M devices 115) in a battery power and air link resource efficient manner. A sleep state may provide the M2M device 115-b with a mode of operation to minimize battery power consumption by shutting down the whole or a part of the devices' transmit/receive circuitry. In addition, an M2M device 115 in the sleep state may not be allocated any dedicated air link resource and therefore a large number of M2M devices may be simultaneously supported. During time intervals where the M2M device 115-b has no traffic activity, the device 115-b may remain in the sleep state to conserve resources.

Paging may involve the M2M device 115-b waking up periodically from the sleep state, and having the M2M device 115-b operate to receive and process a paging message 305 in the forward link communications (e.g., communications from the base station 105-b to the M2M device 115-b). The base station 105-b may be aware when the M2M device 115-b should wake up. Thus, if the base station 105-b intends to contact, or page, the M2M device 115-b, the base station 105-b may send the paging message 305 in a paging channel during all or a portion of one or more paging slots of a forward link frame at the time when the M2M device 115-b is scheduled to wake up and monitor the paging channel. The base station 105-b, however, may not be aware of the signal strength of each M2M device 115 in the M2M wireless WAN. As a result, the base station 105-b may transmit paging messages at a high data rate using a first paging channel. If the M2M device 115-b is unable to properly demodulate the paging message 305 because the signal strength between the base station 105-b and the device 115-b is too low, the base station 105-b may dynamically change the data rate used to transmit the message to the device 115-b. In addition, the base station 105 may increase the frequency it transmits the paging message 305 and the device 115-b may increase the frequency it wakes up to monitor for the paging message 305 sent at the lower data rate. In one configuration, if the base station 105-b does not receive a paging response 310 confirming that the M2M device 115-b has received the paging message, the base station 105-b may retransmit the paging message 305 using a second paging channel during the paging slot more frequently and at a lower data rate. The base station 105-b may retransmit the paging message 305 until either the M2M device 115-b receives the paging message 305 and transmits a paging response 310 and/or a certain number of transmissions of the paging message 305 have occurred. If one or both of these events occur, the base station 105-b and the M2M device 115-b may return to operate under the previous paging cycle and the base station 105-b may return to transmit paging messages to the device 115-b at a high data rate using the first paging channel.

The time interval between two successive wake-up periods of an M2M device 115-b may be referred to as a paging cycle. The M2M device 115-b may operate in a sleep state during the portion of the paging cycle when the M2M device 115-b is not performing processing related to receiving a paging message 305. In order to maximize the benefit of the sleep state, the paging system 300 may use a large value for the paging cycle. For example, in a data system, the paging cycle may be about 5 minutes. As mentioned above, if the base station 105-b does not receive the paging response 310 indicating the successful receipt of the paging message 305, the base station 105-b may retransmit the paging message 305 using a smaller paging cycle until the paging response 310 is received. The retransmission of the paging message 305 may occur using the same channel or a different channel. Further, the M2M device 115-b may wake up more periodically (i.e., shorter paging cycle) to monitor paging slots of frames for the paging message 305.

In one embodiment, the paging channel used during the paging slot of a frame may have sufficient bandwidth to carry a number of paging messages 305. In one example, the paging channel may carry less than the maximum amount of paging messages 305. The base station 105-b may insert system information into the extra, unused bandwidth of the paging channel during the paging slot. The system information may be used by a number of M2M devices 115 to acquire the timing of the signals transmitted from the base station 105-b. Reusing the paging channel to transmit system information avoids the need to set up additional channels during additional time slots of the forward link frames to carry such information (which may increase the overall length of a forward link frame). As a result, M2M devices 115 may conserve power by minimizing the amount of time they are in an awake mode. By reusing the paging channel, the time slots of the frames transmitted on the forward link may be kept short, allowing the M2M devices 115 to return to the sleep mode as quickly as possible.

Upon receiving the paging message 305, the M2M device 115-b may carry out any operations specified in the paging message 305. For example, the M2M device 115-b may just receive the paging message 305 and go back to the sleep state. Alternatively, the M2M device 115-b may access the base station 105-b to establish an active connection with the base station 105-b.

Figure 3B:
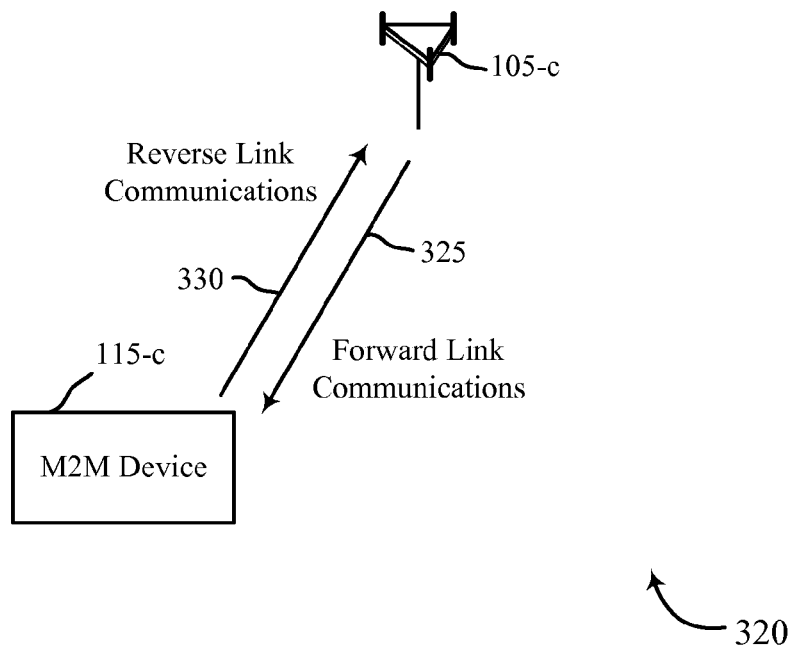
FIG. 3B is a block diagram illustrating one embodiment of a wireless communications system.

FIG. 3B is a block diagram illustrating one embodiment of a wireless communications system 320. The system 320 may include a base station 105-c and an M2M device 115-c. The base station 105-c and the M2M device 115-c may be examples of the base stations and M2M devices of FIG. 1, 2, or 3A. In one configuration, the base station 105-c may communicate with the M2M device 115-c using a forward link frame with a limited number of time slots for logical channels used for forward link communications 325. The M2M device 115-c may communicate with the base station 105-c using reverse link communications 330. Communications that occur using the forward and reverse link communications may be M2M communications, as described above. These communications may take various forms, depending principally on the air interface protocol used by the base station 105-c and the M2M device 115-c.

The base station 105-c may be arranged to communicate on one or more carrier frequencies, typically using a pair of frequency bands to define the forward and reverse links communications, respectively. The base station 105-c may also include a set of directional antenna elements arranged to define multiple cell sectors. M2M communications in each sector on a given carrier frequency may be distinguished from communications in other sectors by modulating the communications in the given sector with a sector-specific code, such as a pseudo-random noise offset ("PN offset"). Further, M2M communications in each sector may be divided into control and traffic channels, each of which may be defined through time division multiplexing (TDM).

In one embodiment, signals may be transmitted on the forward link communications 325 and the reverse link communications 330 in a frame format. Within the frame format, information may be packetized and formatted according to the actual payload data to be communicated over the communication links 325, 330. In one configuration, the format of a frame transmitted on the forward link communications 325 may include various time slots for various channels. In one embodiment, the frame may include a paging slot for the paging channel, an ACK slot for the ACK channel, and a traffic slot for the traffic channel. As mentioned above, paging messages 305 and/or system information may be transmitted in the paging channel (according to the paging cycle) to the M2M device 115-c during a paging slot. ACK messages may be transmitted in the ACK channel to an M2M device during the ACK time slot. These messages may indicate that reverse link transmission were successfully received, decoded, and/or demodulated by the base station 105. Traffic data may be transmitted in the traffic channel to the M2M device 115-c during the traffic time slot. Frames used on the forward link communications 325 in M2M communications may be based on a short duty cycle.

To conserver power, an M2M device 115 may wake up only during specific time slots of specific forward link frames to receive data, paging messages 305, etc. As a result, the frame structure in M2M communications may be slotted for each M2M device. Thus, each device 115 may only be required to wake up during one or more slots of one or more frames that are needed to retrieve its data. At the commencement of a traffic channel cycle, a slot map may be broadcasted to each M2M device 115 that is expecting to receive traffic data during the cycle. The slot map may include information that allows each M2M device to estimate when their respective traffic data will be transmitted on the forward link during the cycle. The information within the slot map may be hashed to enable each device 115 to identify when its data will be transmitted. After receiving the slot map, the devices 115 may return to a sleep state and awake again during the one or more traffic slots in which their data is transmitted.

In one configuration, to preserve communication resources, the M2M device 115-c may perform opportunistic decoding of a message transmitted from the base station 105-c in order to return to the sleep state, according to the present systems and methods. In one embodiment, the base station 105-c may generate one or more forward link frames and transmit multiple copies of a message to the M2M device 115-c using a channel of the one or more forward link frames. Each copy of the message may be sent in a sub-channel at a high data rate. The M2M device 115-c may read as many copies of the message as are needed to successfully demodulate the message. In one configuration, the M2M device 115-c may estimate the number of copies of the message it needs to receive to decode the message based on the received signal strength from a pilot signal transmitted from the base station 105-c. Upon successfully decoding the message, the device 115-c may return to a sleep state before generating and transmitting an physical layer ACK message back to the base station 105-c. If additional copies of the message remain in the sub-channels, the base station 105-c may continue to transmit the additional copies (even though the M2M device 115-c has returned to the sleep state). In one configuration, the device 115-c may conserve battery power by not transmitting the physical layer ACK message to the base station indicating that the message has been demodulated.

In one configuration, to conserve power of the M2M devices, the operating band of the reverse link communications 330 may be divided into multiple reverse link frequency channels where CDMA techniques may be used to multiplex the reverse link communications for multiple M2M devices 115. In one example, each reverse link frequency channel may have its own RoT operation point. At least one frequency channel may be dedicated as a low data rate random access channel, with a low RoT. Dividing the operating band of the reverse link communications 330 may provide for at least one frequency channel with a low RoT operation target (e.g., 1 decibel (dB) or less) for reverse link communications. This channel may be used by M2M devices that do not have a strong signal strength with the base station. Further, a low RoT may reduce the link budget requirement for those devices in locations with large path loss. M2M devices with a strong signal strength with the base station may use frequency channels with a higher RoT operation point. These channels allow for a larger capacity of M2M devices that transmit at a high data rate.

In one example, to further increase the power efficiency of the M2M device 115-c, a narrowband frequency-division multiple access (FDMA) technique may be used for the reverse link communications 330. This technique may include dividing the operating band of the reverse link communications 330 into a number of narrowband frequency channels. The base station 105-c may broadcast the status and assignment of each narrowband channel to each M2M device 115. The status may be "busy" or "idle". In one embodiment, the M2M device 115-c may only transmit data if a narrowband frequency channel is assigned to the device 115-c. The early termination of the reverse link communications 330 (described above) may be incorporated into the narrowband FDMA technique to exploit the signal-to-interference noise ratio (SINR) distribution and to support multiple data rates in the reverse link communications 330. Early termination on the reverse link may occur when the status of a frequency channel transitions from a busy status to an idle status. Upon detecting that the status has transitioned to idle, the M2M device may terminate transmissions on the reverse link.

In one embodiment, as previously stated, the reverse link communications 330 may be terminated early to conserve the battery power of the M2M device 115-c and air interface resources between the M2M device 115-c and the base station 105-c. In addition to terminating reverse link transmissions early through a change in the status of a channel, the forward link frame may include a time slot during which an ACK message may be transmitted. The base station 105-c may use the channel to carry ACK messages that acknowledge the reception of a reverse link physical layer packet sent from the M2M device 115-c using the reverse link communications 330. In one configuration, a greater number of ACK messages may be transmitted in an ACK packet when the conditions of the forward link frame appear to be favorable. This may include identifying a number of copies of a packet an M2M device must transmit on the reverse link communication 330 until it is successfully decoded by the base station. Similarly, a smaller number of ACK messages may be transmitted in an ACK packet when the conditions of the forward link do not appear to be as favorable. Increasing and decreasing the number of ACK messages in a packet effectively changes the data rate that is used to transmit an ACK message to an M2M device. As a result, rather than sending every ACK message at the lowest data rate, some ACK messages may be sent at a higher data rate. When ACKs (i.e., ACK messages) are transmitted at higher data rates to the M2M device 115-c, the device 115-c may receive and decode the ACK more quickly, thus increasing the forward link ACK throughput and terminating the reverse link communications 330 at an earlier time period than if the ACK was transmitted using a low data rate.

Figure 4A:
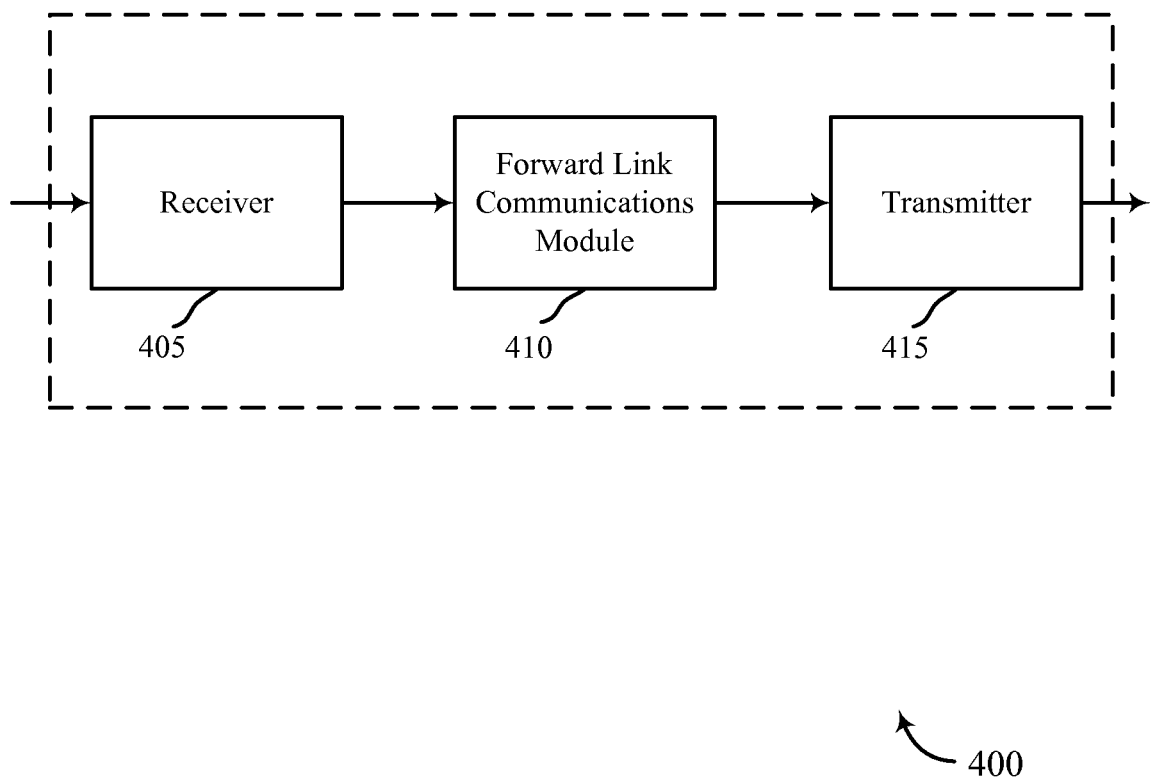
FIG. 4A is a block diagram illustrating a device for managing forward link communications in accordance with various embodiments.

Turning next to FIG. 4A, a block diagram illustrates a device 400 for managing forward link communications in accordance with various embodiments. The device 400 may be an example of one or more aspects of base stations 105 described with reference to FIGS. 1, 2, 3A, and/or 3B. The device 400 may also be a processor. The device 400 may include a receiver module 405, a forward link communications module 410, and/or a transmitter module 415. Each of these components may be in communication with each other.

These components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as a packet, data, and/or signaling information regarding what the device 400 has received or transmitted. The received information may be utilized by the forward link communications module 410 for a variety of purposes.

The receiver module 405 may be configured to receive a reverse link physical layer packet sent from an M2M device 115 using reverse link communications 330. The receiver module 405 may also be configured to receive instructions, a set of operations, messages, etc. from a back-end server to communicate to an M2M device 115. The forward link communications module 410 may generate one or more forward link frames. The frames may be short duty cycle frames that include a minimal number of time slots used for logical channels. The forward link frames may be slotted for communications with multiple M2M devices. Details regarding the forward link frame will be described below.

The forward link communications module 410 may divide a frequency band being used for forward link communications into a plurality of frequency channels. CDMA techniques may be used to allow multiple M2M devices to use the same frequency channel to transmit on the reverse link. Because CDMA is implemented, it is desired that the signal on the reverse link from each M2M device can be received correctly in the presence of the thermal noise of the channel plus the interference caused from the other M2M devices using the channel. For a CDMA system to operate properly, the level of total interference plus thermal noise may be controlled so that it does not overwhelm the received signal. This target interference plus thermal level is the RoT operation point, the RoT threshold, the RoT target, etc. The higher the RoT threshold is for a given frequency channel, a greater number of M2M devices may use that channel to communication on the reverse link. The lower the RoT threshold, the capacity of the channel diminishes. Thus, M2M devices located at a greater distance from the base station may transmit at a low data rate with less power since their transmissions do not require a higher level of power to overcome the RoT threshold.

In one embodiment, the forward link communications module 410 may generate a number of paging messages 305 to transmit to a number of M2M devices 115 via the transmitter module 415. The paging messages 305 may alert specific M2M devices 115 that a base station 105 is requesting the M2M device 115 to make contact with the base station 105. In one configuration, paging messages 305 may be transmitted in the paging channel (or a sub-channel of the paging channel) during the paging time slot at different data rates, depending on whether the M2M device 115 successfully demodulates a paging message.

In one configuration, the paging channel may include less than the maximum number of paging messages 305. If the paging channel does not include the maximum number of paging messages 305, the paging slot may be determined to idle. The unused capacity of the paging channel may be utilized by inserting system information into the paging channel. The system information may then be broadcast to the M2M devices 115 in the paging channel during the paging time slot of the forward link frame. Additional channels and time slots are avoided in forward link frames to transmit this type of information. Instead, idle paging time slots may be reused to transmit system information.

The receiver module 405 may receive a paging response 310 when the M2M device 115 successfully decodes the paging message 305. When the receiver module 405 does not receive the paging response 310, the forward link communications module 410 may be configured to instruct the transmitter module 415 to retransmit the paging message 305. The transmitter module 415 may retransmit the message 305 at a lower data rate and at a higher frequency than the original transmission of the paging message 305. The transmitter module 415 may cease the retransmission when a paging response 310 is received by the receiver module 405 and/or after a certain number of retransmissions of the message 305 have been transmitted. The transmitter module 415 may transmit and retransmit the paging messages 305 on different sub-paging channels of different forward link frames. In one configuration, when the paging channel is not needed to transmit a paging message 305, the forward link communications module 410 may generate and insert system information into the paging channel of the forward link frame. The transmitter module 415 may transmit the system information to an M2M device 115 in the paging channel of the frame. In one configuration, the transmitter 415 may transmit information using multiple paging channels of multiple frames. Paging messages may be transmitted in different paging channels at different data rates and at different paging cycles.

Figure 4B:
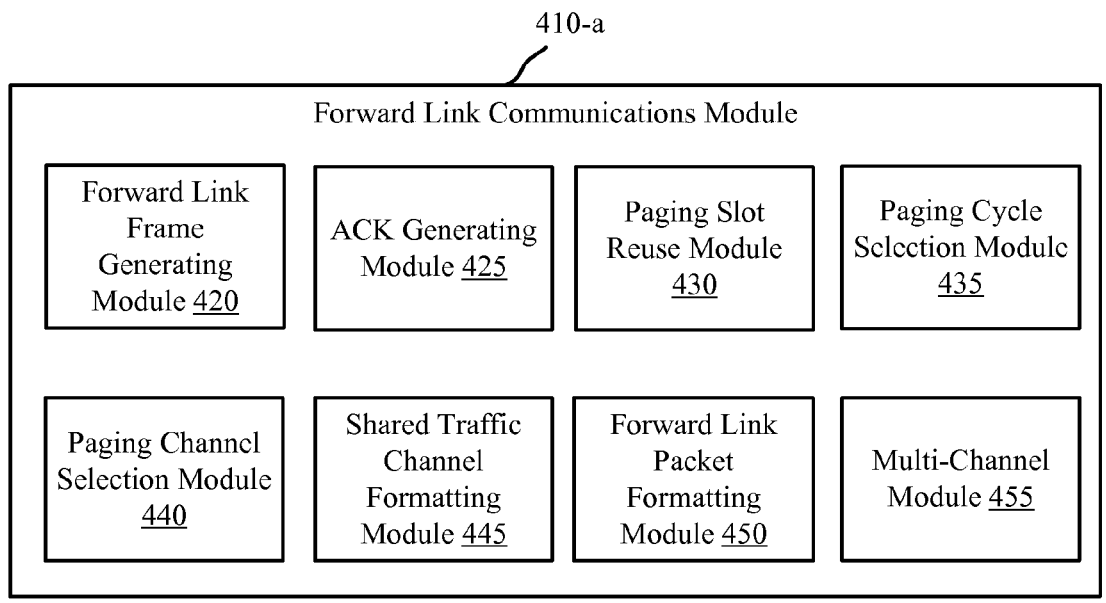
FIG. 4B is a block diagram illustrating one embodiment of a forward link communications module.

FIG. 4B is a block diagram illustrating one embodiment of a forward link communications module 410-a. The module 410-a may be an example of the forward link communications module of FIG. 4A. In one example, the module 410-a may include a forward link frame generating module 420, an ACK generating module 425, a paging slot reuse module 430, a paging cycle selection module 435, a paging channel selection module 440, a shared traffic channel formatting module 445, a forward link packet formatting module 450, and a multi-channel module 455.

The forward link frame generating module 420 may generate a physical layer frame to be used for communications on the forward link 325 (e.g., from a base station to an M2M device). The generated frame may be based on a short duty cycle and a small number of slotted physical layer channels.

For example, the module 420 may generate a forward link physical layer frame that is a total of 20 milliseconds (ms). The slotted operation of the frame generated by the module 420 may allow the M2M device 115 to wake up and turn on its radio only during the scheduled time slot of the frame where it is expecting data. As a result, the M2M device 115 may be in the awake mode for less than the length of the frame.

Each of the physical channels of the forward link frame may include both pilot symbols and data symbols, which may be time division multiplexed (TDM). In one configuration, a forward link frame generated by the module 420 may include a paging slot, an ACK slot, and a traffic slot. Paging messages and other information may be transmitted in a paging channel to an M2M device 115 on the forward link communications 325 during the paging time slot. The ACK messages may be transmitting during the ACK slot. Data traffic may be transmitted in a traffic channel to an M2M device 115 during the traffic slot.

The ACK generating module 425 may generate an ACK message to transmit on the forward link communications 325. The message may be transmitted in an ACK channel that is part of the forward link frame generated by the forward link frame generating module 420. In one configuration, the channel may be used to transmit multiple ACKs in an ACK packet. Each ACK in the packet may be an identifier (ID) of an M2M device 115. The ID may be a network ID of an M2M device. In addition, the ID may be a compressed version of the network ID. For example, a compressed ID may be a hash of the network ID of the M2M device 115. In one configuration, the ACK generating module 425 may group multiple ACKs to create the ACK packet. In one embodiment, ACK packets may include different quantities of ACKs depending on the channel conditions of the forward link.

In some instances, a paging slot may be idle for a certain forward link frame. For example, the capacity of the paging channel during the paging slot may not be at full capacity. For instance, the paging slot may not be scheduled to transmit a paging message 305 for an M2M device 115. As a result, the paging channel may be empty (e.g., no paging messages 305). The paging slot reuse module 430 may reuse the idle paging slot to communicate system information to the M2M device 115. The system information may include system timing and sector number information and may be inserted into the paging channel for transmission to the M2M devices 115 during the paging time slot. Thus, the establishment of additional channels within the forward link frame to convey the system information to an M2M device 115 may be avoided. Instead, the paging slot reuse module 430 may insert the system information in an idle paging channel of the paging slot in the frame.

In one embodiment, the paging cycle selection module 435 may select a particular paging cycle to transmit paging messages to an M2M device. The module 435 may provide a flexible paging scheme to dynamically change the paging cycle for an M2M device 115 in an M2M wireless WAN. The paging cycle selection module 435 may dynamically change the paging cycle depending on whether a paging response 310 is received from the device 115, the time of day, the state of operation of the M2M device 115, etc.

In one configuration, the paging channel selection module 440 may select between sub-channels of the paging channel to transmit a paging message to an M2M device 115 using the forward link communications 325. For example, the selection module 440 may select between a primary and secondary paging channel. The module 440 may provide a paging scheme that allows for paging messages to be transmitted at different data rates in an M2M WAN using primary and secondary paging channels. The primary paging channel may be used for longer paging cycles while the secondary paging channel may be used for shorter paging cycles. In one example, a base station 105 may transmit a first paging message. The module 440 may select the primary channel. The first paging message may be transmitted in the primary channel at a high data rate over a long paging cycle. The base station may also transmit a second paging message. The module 440 may select the secondary paging channel. The second paging message may be transmitted in the second paging message since the second message is to be transmitted at a lower data rate over a shorter paging cycle. In one embodiment, the first and second paging messages may be the same. In one example, the paging channels may be logical channels. In one configuration, the paging channels may be CDMA channels. In one example, the paging channels may be time division multiple access (TDMA) channels.

The shared traffic channel formatting module 445 may format a traffic channel in the forward link frame that may be shared by multiple M2M devices. When a M2M device 115 is expecting data on a shared traffic channel during a traffic slot within a given traffic channel cycle, the device 115 may continue reading the traffic channel slots across multiple forward link frames during a traffic channel cycle until it finds its data as indicated by the ID field. As a result, the M2M device 115 may stay awake longer than necessary to find its data. The formatting module 445 may format the traffic channel in such a way so as to minimize the wake up time for the M2M device 115. The M2M device 115 may determine which slot(s) of a particular frame(s) to wake up in order to retrieve its data on the shared traffic channel. To determine which slot to wake up for, the base station 105 may broadcast a slot map during the first traffic slot of the cycle. The map may use hashing functions to identify which traffic slot an M2M device 115 can expect to receive its data during the cycle. The traffic channel may be formatted by the module 445 to allow the device to determine which slot to use. For example, the module 445 may format the shared traffic channel so that the hashed slot either contains the data or a pointer to a slot where the actual data is located. If a slot of a first frame cannot contain all the pointers, the module 445 may set an overflow flag and provide a pointer to another slot of another frame where the hashed M2M device can check for its data. If all the data for the M2M device 115 cannot be accommodated during a single slot, then the module 445 may format a trailer field of the channel to include a pointer to another slot where the remaining data is transmitted.

The forward link packet formatting module 450 may format a packet to be transmitted on the forward link communications 325. In one example, the module 450 may create multiple copies of the packet. In addition, the module 450 may insert a single copy of the packet into a sub-slot of a time slot in a forward link frame. In one embodiment, a time slot (e.g., paging slot, ACK slot, traffic slot) of a forward link frame may be divided in a number of sub-slots. The forward link packet formatting module 450 may insert a single copy of the packet into each of the generated sub-slots. In one configuration, the channel used to carry the packet during the time slot may also be divided into a number of sub-channels. As a result, a sub-channel may be used during each sub-slot to carry the copy of the packet on the forward link communications 325. Each sub-channel may be used to transmit the copies of the packet at a high data rate.

The multi-channel module 455 may divide an operating frequency band of the reverse link into a number of frequency channels. The module 455 may also set an RoT threshold for each frequency channel. In one embodiment, the multi-channel module 455 may determine which M2M devices 115 in the M2M wireless WAN should use certain channels to communication on the reverse link. The module 455 may transmit these channel assignments to the M2M devices 115. In addition, the multi-channel module 455 may dynamically alter the RoT thresholds of one or more frequency channels. The decision to change an RoT threshold may depend on network congestion, traffic on a one or more individual channels, time of day, and the like. Details regarding dynamically altering RoT threshold of frequency channels will be described in more detail below.

Figure 5A:
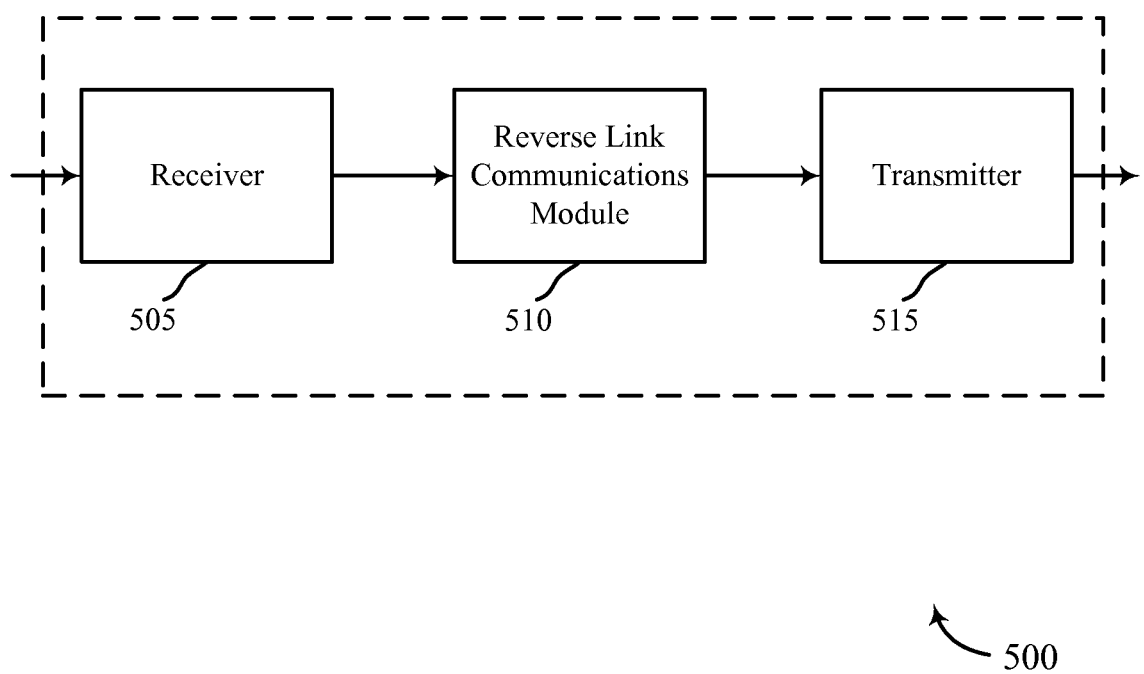
FIG. 5A is a block diagram illustrating a device for managing reverse link communications in accordance with various embodiments.

FIG. 5A is a block diagram illustrating a device 500 for managing reverse link communications in accordance with various embodiments. The device 500 may be an example of one or more aspects of the M2M device 115 and/or the base station 105 described with reference to FIGS. 1, 2, 3A, and/or 3B. The device 500 may also be a processor. The device 500 may include a receiver module 505, a reverse link communications module 510, and/or a transmitter module 515. Each of these components may be in communication with each other.

These components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as a packet, data, and/or signaling information regarding what the device 500 has received or transmitted. The received information may be utilized by the reverse link communications module 510 for a variety of purposes.

The receiver module 505 may be configured to receive a forward link physical layer packet sent from a base station 105 using forward link communications 325. The reverse link communications module 510 may generate a reverse link frame that includes a traffic slot during which traffic may be transmitted from an M2M device 115 to a base station 105.

In one embodiment, the reverse link communications module 510 may cause communications on the reverse link to terminate early. As previously explained, the receipt of an ACK message from a base station 105 may trigger early termination on the reverse link. Upon receiving the ACK message, the reverse link communications module 510 may instruct the transmitter 515 to cease transmitting communications on the reverse link communications 330. Details regarding the reverse link communications module 510 will be described below.

Figure 5B:
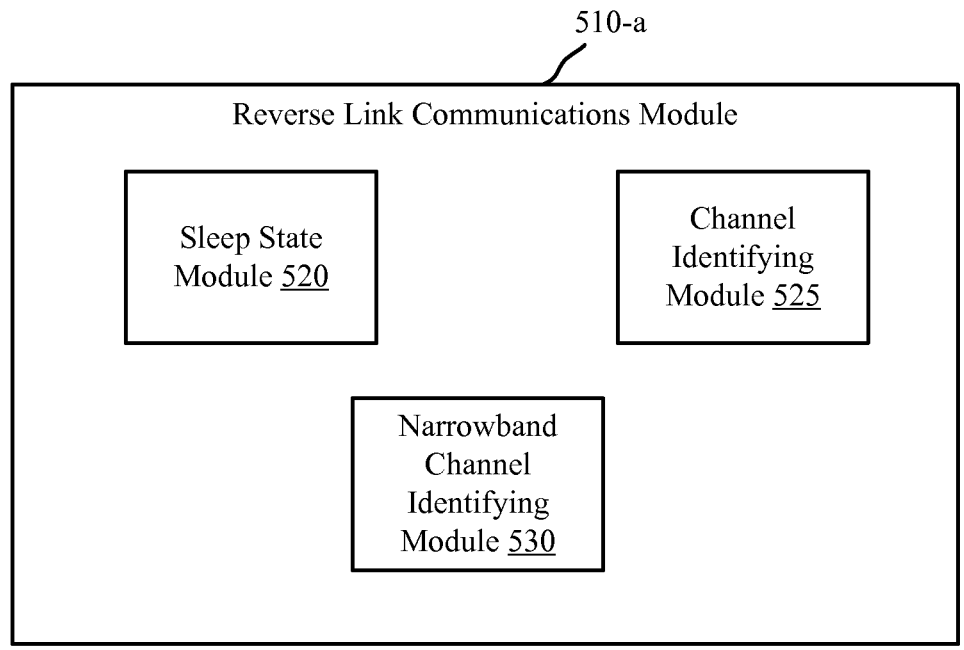
FIG. 5B is a block diagram illustrating one embodiment of a reverse link communications module.

FIG. 5B is a block diagram illustrating one embodiment of a reverse link communications module 510-a. The module 510-a may be an example of the reverse link communications module of FIG. 5A. In one example, the module 510-a may include a sleep state module 520, a channel identifying module 525, and a narrowband channel identifying module 530.

In one configuration, the sleep state module 520 may allow an M2M device 115 to wake up long enough to receive a message from a base station 105 and then return to a sleep state to conserve power. The base station may transmit a message to the M2M device using a forward link frame. The frame may include a paging channel to carry the message. The paging channel may include a number of sub-channels. The base station may transmit a copy of the message in each sub-channel. When the M2M device successfully receives and demodulates the message on one of the sub-channels, the sleep state module 520 may cause the M2M device 115 to turn off its radio and return to a sleep state to conserve the battery without sending an ACK message back to the base station.

In one embodiment, the channel identifying module 525 may identify a reverse link channel to use based at least in part on the RoT level of the channel. As previously explained, the operating band of the reverse link may be divided into multiple reverse link frequency channels. Within each frequency channel, CDMA may be implemented for multiple user multiplexing. Each frequency channel may have its own target RoT operation point. At least one frequency channel may be dedicated as a low data rate random access channel with a low RoT operation point. Depending on certain factors, the channel identifying module 525 may identify a particular frequency channel to use to communication on the reverse link. In one configuration, the strength of the signal received on the forward link from the base station may be used by an M2M device to determine whether to use a frequency channel with a high RoT threshold or a low RoT threshold. The current congestion of a frequency channel may also be used by the module 525 to determine whether or not to use that channel. Further, the module 525 may select a channel with a high RoT threshold to use to transmit a data packet at a high data rate. If the data packet is not received (i.e., no ACK message is received from base station), the module 525 may switch to a channel with a low RoT threshold to transmit the data packet at a low data rate. In one example, the channel identifying module 525 may perform an open loop data rate prediction. If the module 525 predicts a low data rate (e.g., 200 bits per second (bps)), the module 525 may select the frequency channel that has been dedicated as the low data rate random access channel with the low RoT threshold. In one example, the base station may predict the data rate of each M2M device and instruct the M2M devices that are predicted to transmit at a low data rate to use the dedicated frequency channel with the low RoT threshold. In one configuration, the channel identifying module 525 may determine the strength of signals on the forward link. If the strength of the signals on the forward link is below a threshold, the module 525 may conclude that it is located in an area with poor signal quality between itself and the base station. As a result, the module 525 may identify the dedicated low RoT frequency channel as the channel to use to transmit to the base station on the reverse link.

In one example, the narrowband channel identifying module 530 may identify a narrowband channel to use to transmit data on the reverse link based at least in part on the status of the channel. In one embodiment, the operating band of the reverse link may be divided into a number of narrowband frequency channels. A busy or idle status of each narrowband channel may be broadcasted to each M2M device 115. The devices may contend for a channel selected randomly from the idle set of channels by sending a preamble. The module 530 may select a transmit data on the reverse link using the channel if the channel is either implicitly or explicitly assigned to the M2M device. While the M2M device is transmitted data on a channel that has been either implicitly or explicitly assigned, the transmission of the data on the channel may not be interrupted by another M2M device attempting to transmit a data packet using the same channel.

Figure 6:
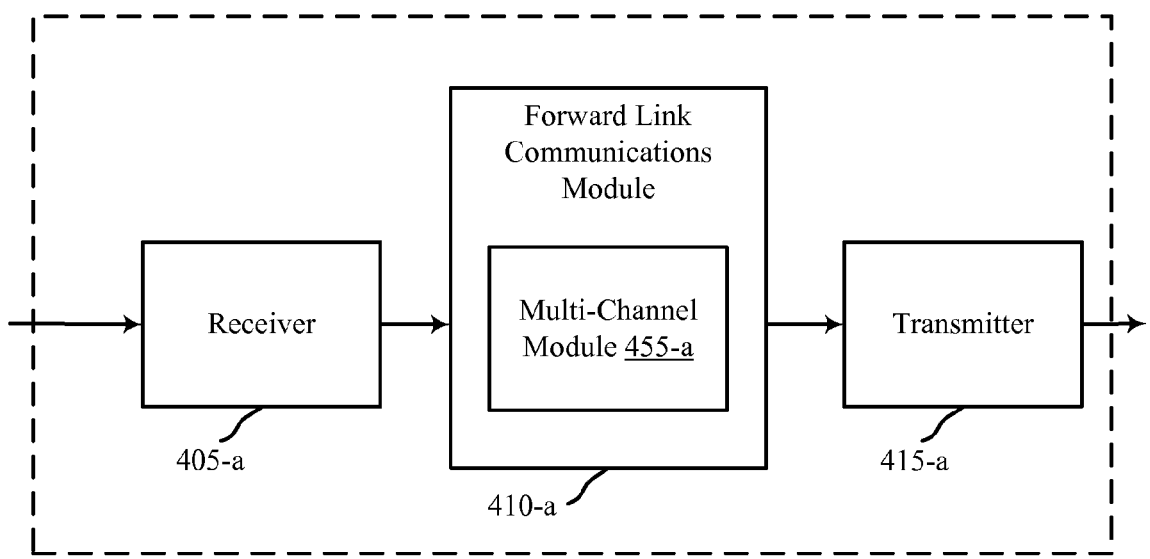
FIG. 6 is a block diagram illustrating a device for managing forward link communications in accordance with various embodiments.

FIG. 6 is a block diagram illustrating a device 600 for managing forward link communications in accordance with various embodiments. The device 600 may be an example of one or more aspects of the base station described with reference to FIGS. 1, 2, 3A, 3B, 4A, and/or 4B. The device 600 may also be a processor. The device 600 may include a receiver module 405-a, a forward link communications module 410-a, and/or a transmitter module 415-a. Each of these components may be in communication with each other.

The components of the device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405-a may receive information such as packet, data, and/or signaling information regarding what the device 600 has received or transmitted. The received information may be utilized by the forward link communications module 410-a for a variety of purposes, as previously described.

In one configuration, the forward link communications module 410-a may include a multi-channel module 455-a. The module 455-a may be an example of the module 455 of FIG. 4B. In one configuration, the multi-channel module 455-a may generate a number of CDMA frequency channels from the operating frequency band. A separate and distinct RoT operation threshold may be set for each individual frequency channel. Details regarding the setting of the RoT thresholds will be described below.

Figure 7:
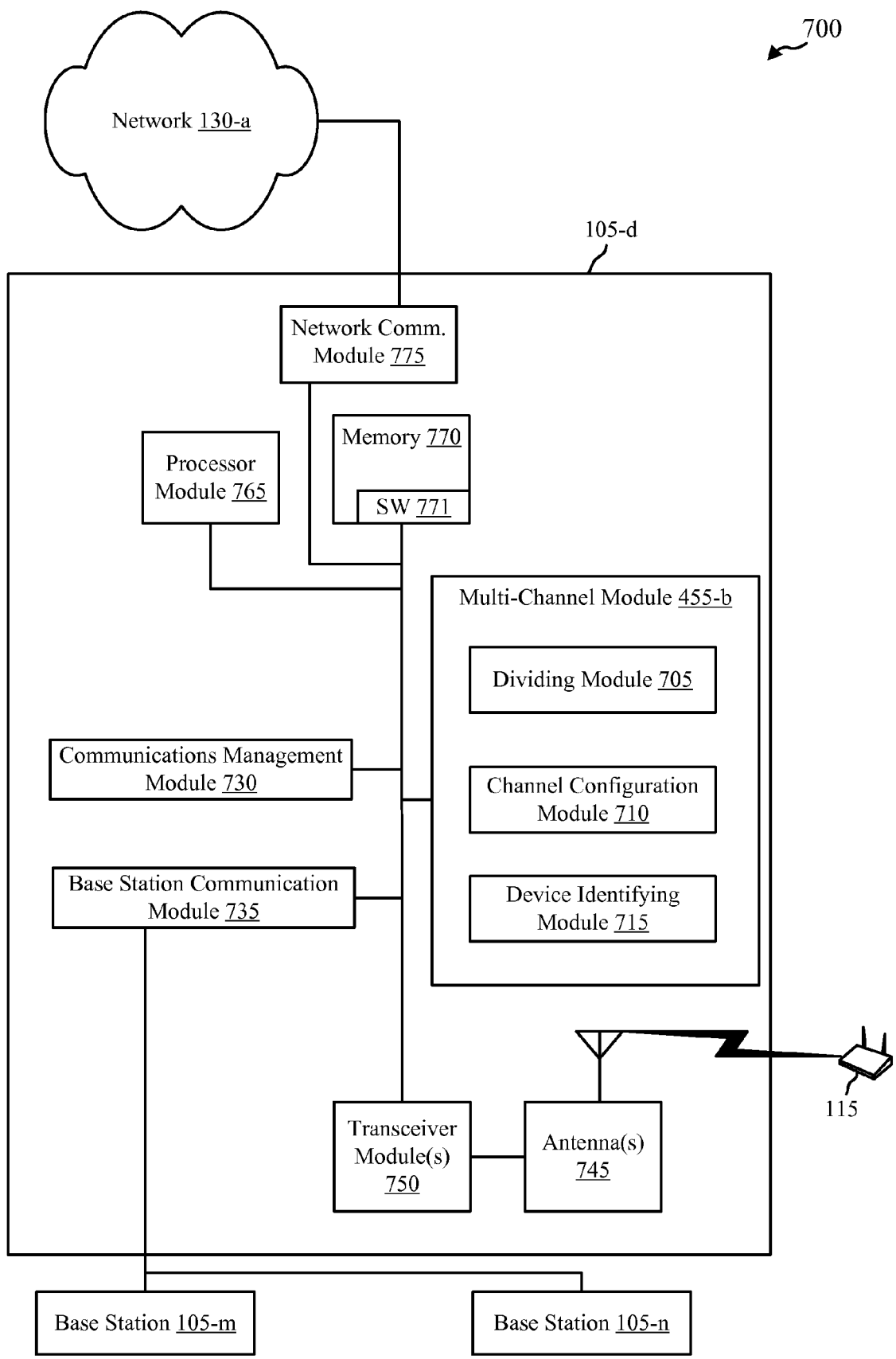
FIG. 7 shows a block diagram of a communications system that may be configured for setting and adjusting RoT thresholds for CDMA frequency channels to conserver power of M2M devices in accordance with various embodiments.

FIG. 7 shows a block diagram of a communications system 700 that may be configured for setting and adjusting RoT thresholds for CDMA frequency channels to conserver power of M2M devices 115 in accordance with various embodiments. This system 700 may be an example of aspects of the system 100 depicted in FIG. 1, system 200 of FIG. 2, system 300 of FIG. 3A, 320 of FIG. 3B, system 400 of FIG. 4A, and/or system 600 of FIG. 6.

The system 700 may include a base station 105-d. The base station 105-d may include antennas 745, a transceiver module 750, memory 770, and a processor module 765, which each may be in communication, directly or indirectly, with each other (e.g., over one or more buses). The transceiver module 750 may be configured to communicate bi-directionally, via the antennas 745, with an M2M device 115, which may be a sensor, meter, or any other type of device capable of tracking, sensing, monitoring, etc. The transceiver module 750 (and/or other components of the base station 105-d) may also be configured to communicate bi-directionally with one or more networks. In some cases, the base station 105-d may communicate with the core network 130-a through network communications module 775.

Base station 105-d may also communicate with other base stations 105, such as base station 105-m and base station 105-n. Each of the base stations 105 may communicate with the M2M device 115 using different wireless communications technologies, such as different Radio Access Technologies. In some cases, base station 105-d may communicate with other base stations such as 105-m and/or 105-n utilizing base station communication module 735. In some embodiments, base station 105-d may communicate with other base stations through the controller 120 and/or core network 130-a.

The memory 770 may include random access memory (RAM) and read-only memory (ROM). The memory 770 may also store computer-readable, computer-executable software code 771 containing instructions that are configured to, when executed, cause the processor module 765 to perform various functions described herein (e.g., placement of RoT operating points, ACK schemes, dynamic data rate schemes for paging messages, flexible paging schemes, data traffic schemes, etc.). Alternatively, the software 771 may not be directly executable by the processor module 765 but may be configured to cause the computer, e.g., when compiled and executed, to perform functions described herein.

The processor module 765 may include an intelligent hardware device, e.g., a central processing unit (CPU) such as those made by Intel® Corporation or AMD®, a microcontroller, an application-specific integrated circuit (ASIC), etc. The transceiver module 750 may include a modem configured to modulate packets for the M2M device 115 and provide the modulated packets to the antennas 745 for transmission, and to demodulate packets received from the antennas 745. While some examples of the base station 105-d may include a single antenna 745, the base station 105-d preferably includes multiple antennas 745 for multiple links which may support carrier aggregation. For example, one or more links may be used to support macro communications with the M2M device 115.

According to the architecture of FIG. 7, the base station 105-d may further include a communications management module 730. The communications management module 730 may manage communications with other base stations 105. By way of example, the communications management module 730 may be a component of the base station 105-d in communication with some or all of the other components of the base station 105-d via a bus. Alternatively, functionality of the communications management module 730 may be implemented as a component of the transceiver module 750, as a computer program product, and/or as one or more controller elements of the processor module 765.

The components for base station 105-d may be configured to implement aspects discussed above with respect to device 600 in FIG. 6 and may not be repeated here for the sake of brevity. In one embodiment, the base station 105-d may include a multi-channel module 455-b, which may be an example of the module 455 illustrated in FIGS. 4B and/or 6. The module 455-b may include a dividing module 705, a channel configuration module 710, and a device identifying module 715.

In one configuration, the dividing module 705 may identify the current operating frequency band used by the base station 105-d to communication on the forward link to a number of M2M devices 115 in the M2M wireless WAN. The module 705 may divide the operating band up into a number of individual frequency channels. The frequency channels may employ CDMA techniques to allow a number of different M2M devices to use the same channel to communicate on the reverse link.

In one embodiment, the channel configuration module 710 may configure each CDMA frequency channel with a RoT operating point. For example, a first group of one or more frequency channels may be configured with a RoT operating point that is set at a first level. A second group of one or more channels may be configured with a RoT operating point that is set at a second level, which may be lower than the first level. In one configuration, a channel in the first group of channels may have capacity to carry data packets for more M2M devices, than a channel in the second group of channels. In addition, data packets carried on a channel in the first group may be transmitted at a higher data rate than packets carried on a channel in the second group.

The device identifying module 715 may identify one or more M2M devices 115 to use a channel in the first group of channels as well as one or more M2M devices 115 to use a channel in the second group. The module 715 may identify devices 115 that are located within a certain distance from the base station 105-d and may instruct these devices 115 to use channels in the first group to transmit data packets on the reverse link. Devices 115 that are located beyond the distance from the base station 105-d may be instructed by the module 715 to use channels in the second group to transmit their data packets. In one configuration, the module 715 may determine which devices 115 are located within the certain distance of the base station 105-d by estimating the signal strength of forward link communications received at the M2M devices 115. A strong signal strength may indicate a closer proximity to the base station 105-d than an estimated weak signal strength. The module 715 may also use a time of day parameter to identify which devices 115 should communicate on the different channels. In one embodiment, at the time of day where network congestion is expected to be low, the module 715 may instruct M2M devices 115 to use a frequency channel with a low RoT threshold. The capacity of this channel may be low, but the expected congestion on the reverse link is also expected to be low. As a result, M2M devices 115 may be able to transmit on this channel using lower power because of the low RoT. If network congestion is expected to be high, the module 715 may reserve the channel with the low RoT threshold for those M2M devices that located at a greater distance from the base station 105-d that transmit at a low data rate.

In some embodiments, the transceiver module 750 in conjunction with antennas 745, along with other possible components of base station 105-d, may transmit a number of forward link frames that each include a traffic slot, from the base station 105-d to the M2M device 115, to other base stations 105-m/105-n, or core network 130-a.

Figure 8:
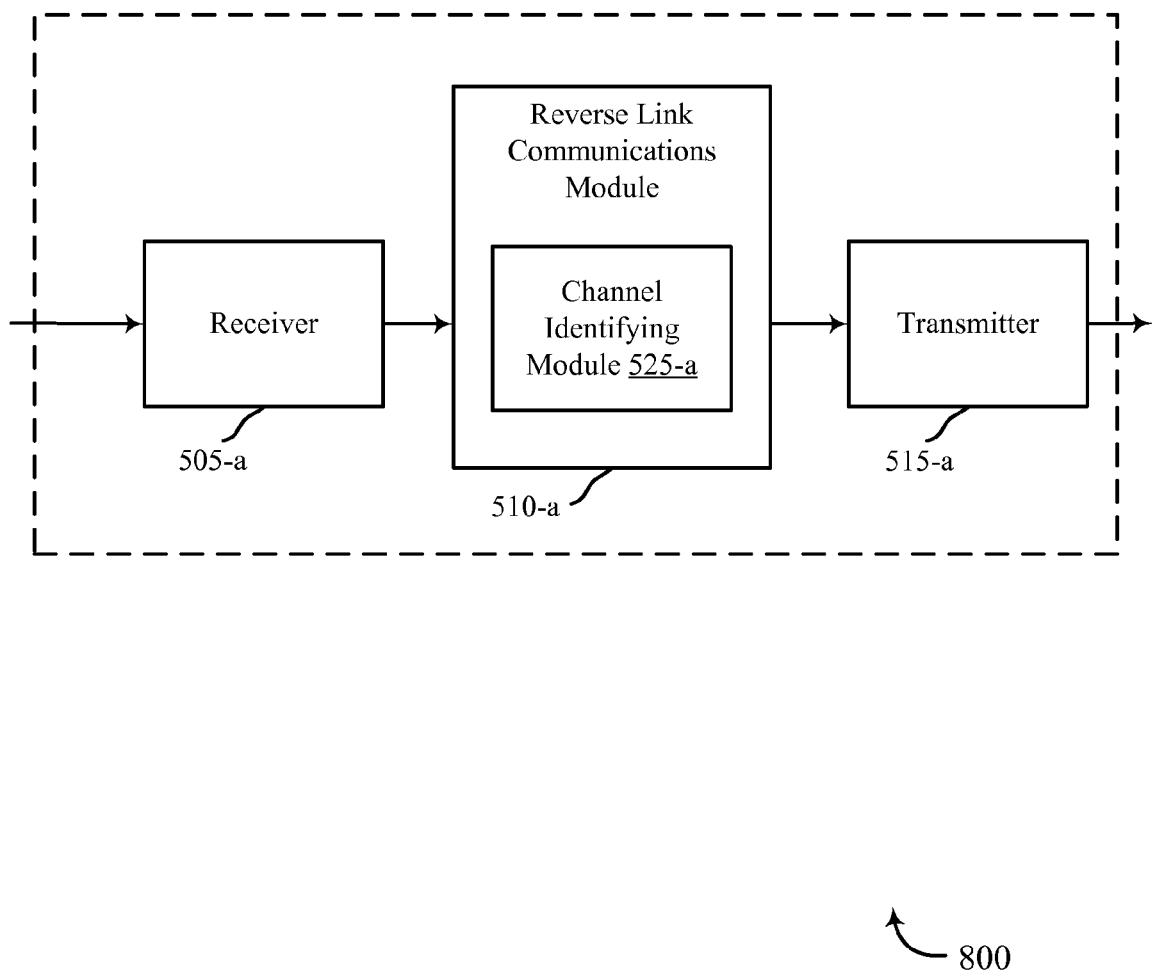
FIG. 8 is a block diagram illustrating a device for managing reverse link communications in accordance with various embodiments.

FIG. 8 is a block diagram illustrating a device 800 for managing reverse link communications in accordance with various embodiments. The device 800 may be an example of one or more aspects of the M2M device 115 described with reference to FIGS. 1, 2, 3A, 3B, and/or 5A. The device 800 may also be a processor. The device 800 may include a receiver module 505-a, a reverse link communications module 510-a, and/or a transmitter module 515-a. The reverse link communications module 510-a may include a channel identifying module 525-a. The module 525-a may be an example of the module 525 described with reference to FIG. 5B. Each of these components may be in communication with each other.

These components of the device 800 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505-a may receive information such as packet, data, and/or signaling information regarding what the device 800 has received or transmitted. The received information may be utilized by the reverse link communications module 510-a for a variety of purposes. The transmitter module 515-a may transmit a packet, data, and/or signaling information on the reverse link in a reverse link frame. The reverse link frame may include a traffic slot and no other control slots during which control information may be transmitted. The traffic slot may have a length of 20 ms during which data may be transmitted on the reverse link.

The receiver module 505-a may be configured to receive a forward link physical layer data packet sent from a base station 105 on the forward link. In one example, the receiver module 505-a may receive a signal strength of the forward link that may be used by the device 800 to determine which frequency channel to use with the appropriate RoT threshold for communications on the reverse link. The channel identifying module 525-a may analyze the received signal strength and determine a frequency channel to use with the appropriate RoT threshold based on the analysis of the signal strength. In addition, the receiver module 505-a may receive interference signals from other M2M devices 115 using the channel to communicate on the reverse link. In one embodiment, the base station 105 may periodically broadcast its congestion level (i.e., long term average RoT) on the forward link. The channel identifying module 525-a may analyze the level of interference signals, congestion level reported by the base station 105, etc. to determine an estimated congestion level of the network. The module 525-a may select a frequency channel to use with a certain RoT level based at least in part on the estimated congestion of the reverse link in the network. The transmitter module 515-a may transmit a data packet on the reverse link using the frequency channel identified by the channel identifying module 525-a.

Figure 9:
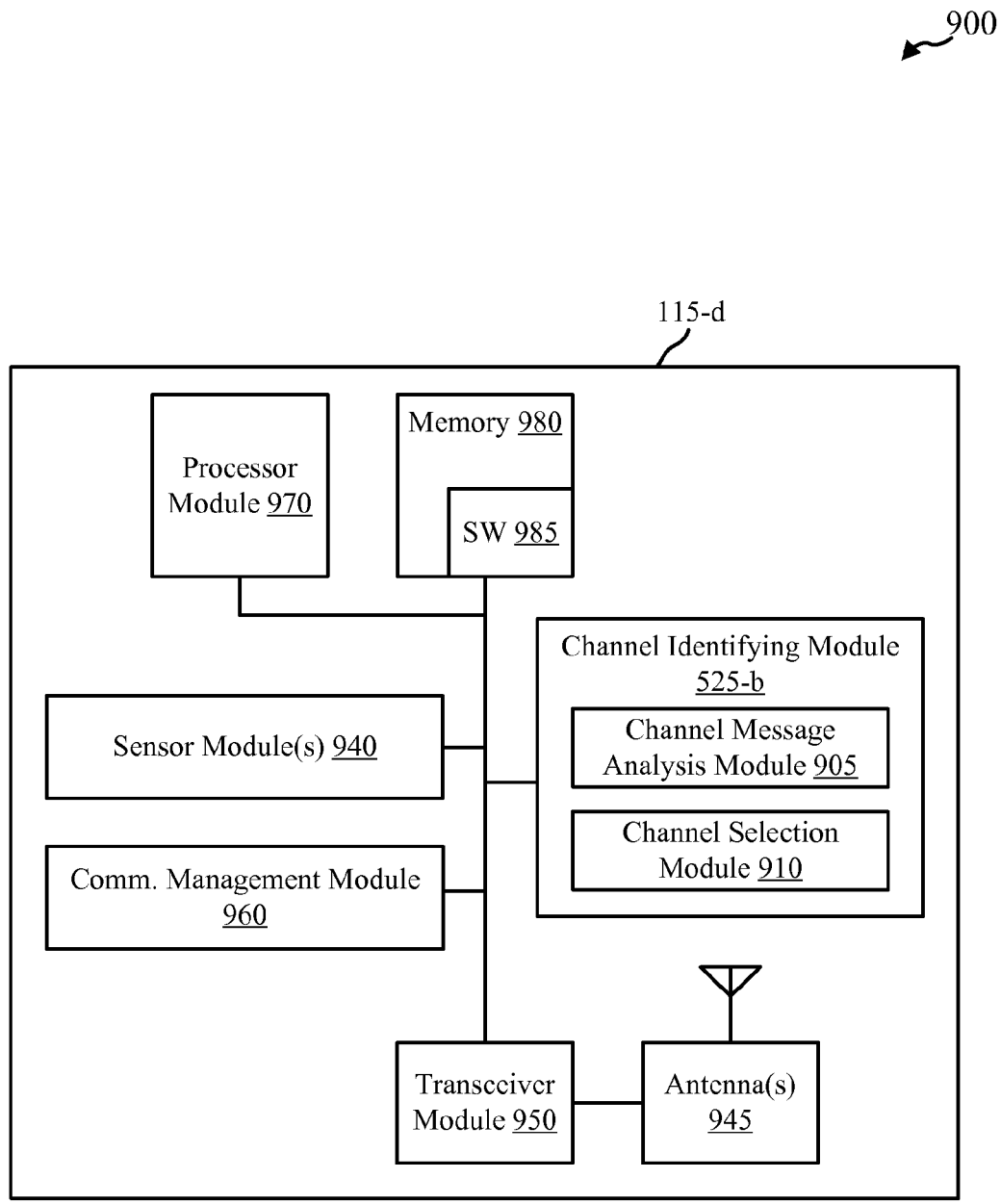
FIG. 9 shows a block diagram of a M2M device to manage consumption of power in accordance with various embodiments.

FIG. 9 shows a block diagram 900 of a M2M device 115-d to manage consumption of power in accordance with various embodiments. The M2M device 115-d may have any of various configurations, such as a sensor or monitor for various M2M applications discussed above. The M2M device 115-d may capture or sense information via sensor module(s) 940. The M2M device 115-d may have an internal power supply, such as a small battery, to facilitate mobile operation. In some embodiments, the M2M device 115-d may be the M2M device 115 described with reference to FIGS. 1, 2, 3A, and/or 3B. The M2M device 115-d may include aspects of device 500 of FIG. 5A and/or device 800 of FIG. 8. The M2M device 115-d may be a multi-mode mobile device. The M2M device 115-d may be referred to as an M2M UE or MTC device in some cases.

The M2M device 115-d may include antenna(s) 945, a transceiver module 950, memory 980, and a processor module 970, which each may be in communication, directly or indirectly, with each other (e.g., via one or more buses). The transceiver module 950 may communicate bi-directionally, via the antenna(s) 945 and/or one or more wired or wireless links, with one or more networks, as described above. For example, the transceiver module 950 may communicate bi-directionally with base stations 105 of FIGS. 1, 2, 3A, 3B and/or 7. Further, the transceiver module 950 may communicate with aspects of device 400 of FIG. 4A and/or device 600 of FIG. 6. The transceiver module 950 may include a modem configured to modulate the packets and provide the modulated packets to the antenna(s) 945 for transmission, and to demodulate packets received from the antenna(s) 945. While the M2M device 115-d may include a single antenna 945, the M2M device 115-d may include multiple antennas 945 for multiple transmission links.

The memory 980 may include random access memory (RAM) and read-only memory (ROM). The memory 980 may store computer-readable, computer-executable software code 985 containing instructions that are configured to, when executed, cause the processor module 970 to perform various functions described herein (e.g., receive packets, enter a sleep state, etc.). Alternatively, the software code 985 may not be directly executable by the processor module 970 but be configured to cause the computer (e.g., when compiled and executed) to perform functions described herein. The processor module 970 may include an intelligent hardware device, e.g., a central processing unit (CPU) such as those made by Intel® Corporation or AMD®, an ASIC, a microcontroller, etc.

According to the architecture of FIG. 9, the M2M device 115-*d* may further include a communications management module 960. The communications management module 960 may manage communications with base stations 105 and/or other M2M devices 115. By way of example, the communications management module 960 may be a component of the M2M device 115-*d* in communication with some or all of the other components of the M2M device 115-*d* via a bus. Alternatively, functionality of the communications management module 960 may be implemented as a component of the transceiver module 950, as a computer program product, and/or as one or more controller elements of the processor module 970.

In some embodiments, M2M device 115-*d* may measure and/or capture data and transmit the data to a network without performing explicit registration on the network. In one embodiment, M2M device 115-*d* may monitor pilot signals of available base stations or network cells and select a base station or network cell for communication without explicitly registering with the base station or network cell. In some configurations, while not explicitly registered on the selected base station or network cell, M2M device 115-*d* may monitor system information for the selected base station or network cell. The system information for the selected base station or network cell may include explicit registration triggers and the M2M device 115-*d* may suppress explicit registration on a network even when one of the explicit registration triggers is detected. For example, the M2M device 115-*d* may suppress registrations based on one or more registration triggers such as device power up/power down, frequency/band class changes, time period-based registration, movement-based registration, zone-based registration, and/or parameter change based registration.

The system information may include access parameters for use in accessing the selected base station or network cell. The M2M device 115-*d* may capture or measure information related to an event (e.g., via sensor module(s) 940) and transmit that information to the selected base station or network cell as part of a network access prior to, or without performing, explicit registration on the selected base station or network cell. The network access may be performed using one or more of the access parameters. The M2M device 115-*d* may be implicitly registered by the selected base station or network cell as part of the network access transmitting the captured or measured event data to the selected base station or network cell.

Suppressing registration may also allow M2M device 115-*d* to select the best network cell for transmissions without regard to the power penalty incurred in registering with a target cell. For example, M2M device 115-*d* may select between available networks based on the estimated power consumption for communication with the respective networks without accounting for the power penalty that would be incurred by performing an explicit handover (with an explicit registration on the new network).

The components for M2M device 115-*d* may be configured to implement aspects discussed above with respect to device 500 of FIG. 5A and/or device 800 of FIG. 8 and may not be repeated here for the sake of brevity. In one example, the M2M device 115-*d* may include a channel identifying module 525-*b*, which may be an example of the module of FIG. 5A and/or FIG. 8. The channel identifying module 525-*a* may include a channel message analysis module 905 and a channel selection module 910. As previously mentioned, the channel identifying module 525-*b* may determine which frequency channel to use (with a certain RoT threshold) based on certain conditions of the network, the signal strength of the forward link, etc. In one embodiment, the module 525-*b* may select a channel with a high RoT threshold and the M2M device 115-*d* may use this channel to transmit a data packet a high data rate on the reverse link. The module 525-*b* may monitor for an ACK message received from the base station indicating whether or not the data packet has been received. Upon not receiving the ACK message, the channel identifying module 525-*b* may switch to use a frequency channel with a lower RoT threshold. The M2M device 115-*d* may then transmit the data packet a low data rate.

In one configuration, the base station 105 may instruct the M2M device 115-*d* as to which frequency channel (based on the RoT threshold), the device should use to communicate on the reverse link. As a result, the module 525-*b* may also identify a channel to use for transmissions on the reverse link based on assignment information or instructions received from the base station 105. For example, the base station 105 may determine which frequency channel should be used by the M2M device 115 and may transmit these instructions to the device. The channel message analysis module 905 may receive these instructions or assignment message and identify the frequency channel indicated by the instructions or the assignment message. The channel selection module 910 may select the channel identifying by the module 525-*b*. The selected channel may be used for reverse link communications to carry data packets from the M2M device 115-*d* to the base station 105.

Figure 10:
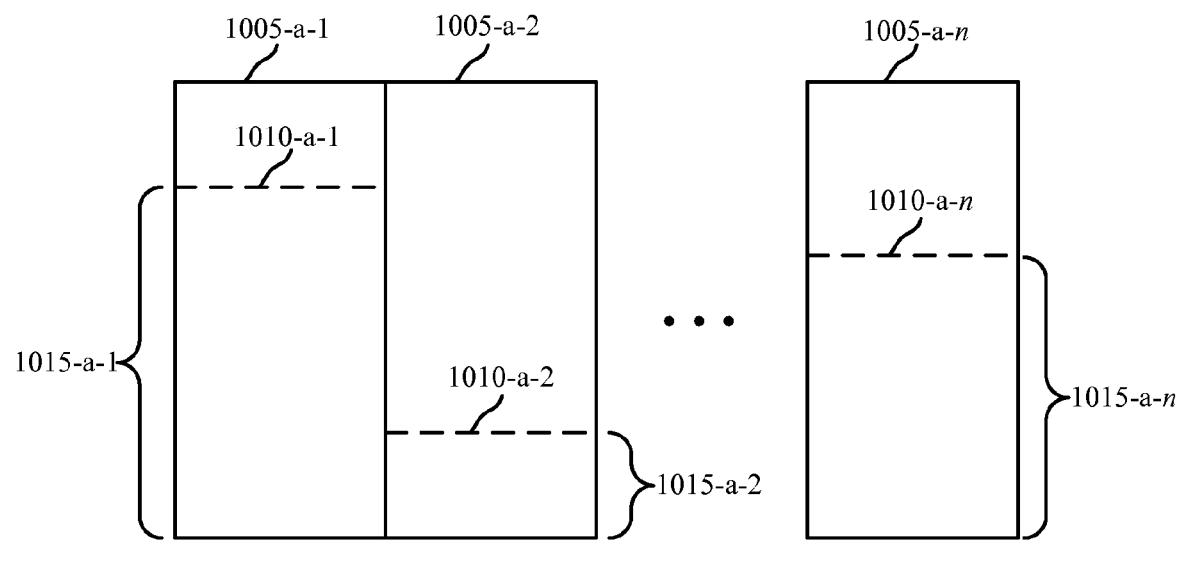
FIG. 10 is a block diagram illustrating one embodiment of a number of frequency channels available to be used for reverse link communications.

FIG. 10 is a block diagram 1000 illustrating one embodiment of a number of frequency channels 1005 available to be used for reverse link communications. In one configuration, the operating frequency band of the reverse link may be divided into the number of frequency channels 1005. The resulting number of frequency channels may depend on various factors. For example, the number of frequency channels obtained from the division may increase as the number of M2M devices 115 in the M2M wireless WAN increases. Further, the number of frequency channels may increase if the level of congestion on the network is expected to be above a certain level. In addition, the number of frequency channels may increase as the size of a coverage cell of a base station 105 increases. In one embodiment, the base station 105 may include processing to determine the number of frequency channels to generate from a division of the operating frequency band of the reverse link.

Each frequency channel 1005 may include a RoT threshold 1010. The RoT threshold 1010 may indicate the total interference level on the reverse link that the base station 105 prefers to operate at. In one configuration, a first frequency channel 1005-*a*-1 may include a first RoT threshold 1010-*a*-1. A second frequency channel 1005-*a*-2 may include a second RoT threshold 1010-*a*-2. The first threshold 1010-*a*-1 may be higher than the second threshold 1010-*a*-2. As a result, M2M devices 115 using the first frequency channel 1005-*a*-1 may be required to transmit their data packets with more power than M2M devices 115 using the second frequency channel 1005-*a*-2 to transmit their data packets to overcome higher interference level.

The RoT threshold 1010 of a frequency channel may determine the capacity of that particular channel. In one embodiment, the frequency channel 1005-*a*-1, with a first RoT threshold 1010-*a*-1, may have a first capacity 1015-*a*-1. In contrast, the second frequency channel 1005-*a*-2, with the second RoT threshold 1010-*a*-2, may have a second capacity 1015-*a*-2 that is lower than the first capacity 1015-*a*-1. The capacity may represent the number of M2M devices that are able to use the frequency channel simultaneously, based on the RoT threshold 1010 for that channel. As a result, as the RoT threshold of a channel increases, the capacity 1015 of that channel also increases. Similarly, as the threshold decreases, the capacity of the channel declines.

In one embodiment, the RoT threshold 1010 may also indicate the data rate that may be used to transmit a data packet. In one embodiment, data packets transmitted on the first frequency channel 1005-*a*-1 may be transmitted at a higher data rate than packets transmitted on the second channel 1005-*a*-2 with a lower RoT threshold. In one configuration, packets may be transmitted on at a high data rate using a channel with a low RoT threshold. The ability to transmit at a high data rate may depend on the number of M2M devices 115 using that frequency channel. If the number of devices 115 using the low RoT channel is below a threshold, high data rates may be achieved.

Figure 11:
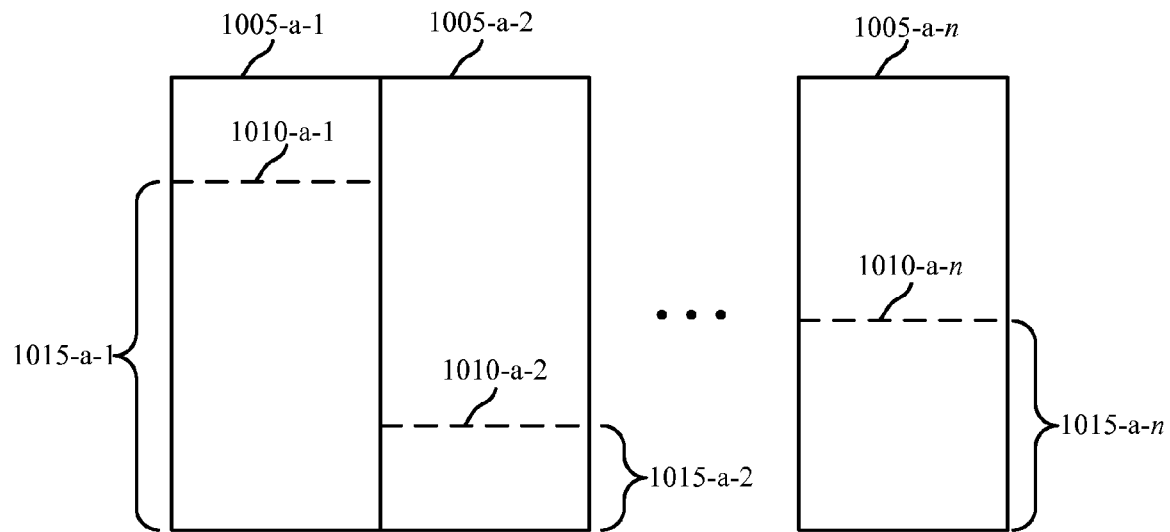
FIG. 11 is a block diagram illustrating one embodiment of adaptively altering RoT thresholds for one or more frequency channels.
Figure 11:
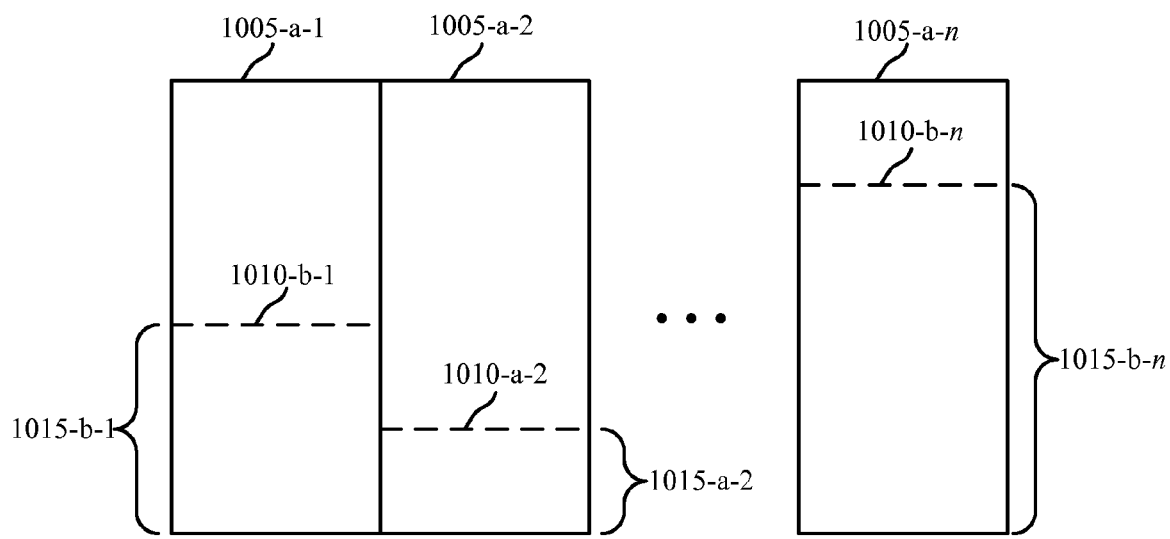

FIG. 11 is a block diagram 1100 illustrating one embodiment of adaptively altering RoT thresholds for one or more frequency channels 1005. In one configuration, after the operating frequency band of the reverse link has been divided into a number of frequency channels 1005, an RoT threshold may be set for each channel 1005. In one embodiment, the threshold 1010 may be set upon completing the division of the operating band. In another embodiment, the setting of the RoT threshold 1010 may be triggered by an assignment of a channel to an M2M device 115 to use on the reverse link.

In one example, after an RoT threshold 1010 has been established, the threshold 1010 may be dynamically changed (e.g., raised or lowered). Altering an RoT threshold 1010 may be triggered if a number of M2M devices 115 using a channel changes. In addition, the threshold 1010 may be changed based on an estimated congestion level of communications on the reverse link. In one example, the time of day may influence whether or not to modify a RoT threshold 1010 that has been previously set for a frequency channel. The time of day may be a factor in determining the estimated level of congestion on the reverse link.

In one embodiment, at time t1, RoT thresholds 1010 may be set for various frequency channels 1005. The RoT thresholds 1010 may indicate the signal strength that is required on each particular channel in order to overcome the interference level on the channel caused by signals of other M2M devices 115 using the channel as well as the thermal noise level of the channel. At time t2, which may occur after the time t1, some of the RoT thresholds 1010 may dynamically change. For example, a first RoT threshold 1010-*a*-1 established at time t1 for a first frequency channel 1005-*a*-1 may provide the first channel 1005-*a*-1 with a certain capacity level 1015-*a*-1. At time t2, the first RoT threshold 1010-*b*-1 may be lowered, reducing the capacity level 1015-*b*-1 of the channel 1005-*a*-1. In one example, at time t1 a certain number of M2M devices 115 may use the first frequency channel 1005-*a*-1 to communicate on the reverse link. At time t2, however, the number of devices 115 using the first channel 1005-*a*-1 may have decreased. Thus, the first RoT threshold may also decrease. If the number of M2M devices 115 using a particular channel increases, the RoT threshold 1010 for that channel may also increase.

In one configuration, at least one frequency channel 1005 may be available on the reverse link that has a low RoT threshold 1010. This channel 1005 may be used by M2M devices 115 that do not have a strong signal strength on the reverse link with the base station 105. These devices 115 may have a large path loss because they are located at a greater distance from the base station 105 than those M2M devices 115 that have a strong signal strength with the base station 105. The channel 1005 with the low RoT threshold may vary from time to time. In one example, a second frequency channel 1005-*a*-2 may include a second RoT threshold 1010-*a*-2 that is lower than the thresholds 1010 of the remaining channels 1005. At time t2, the second RoT threshold 1010-*a*-2 may remain the same. At a subsequent time, however, the second RoT threshold 1010-*a*-2 may increase so as to not be the lowest RoT threshold. In one configuration, the RoT threshold 1010 of another channel 1005 may decrease and may now be the channel used by M2M devices 115 with a large path loss to communicate on the reverse link.

Figure 12:
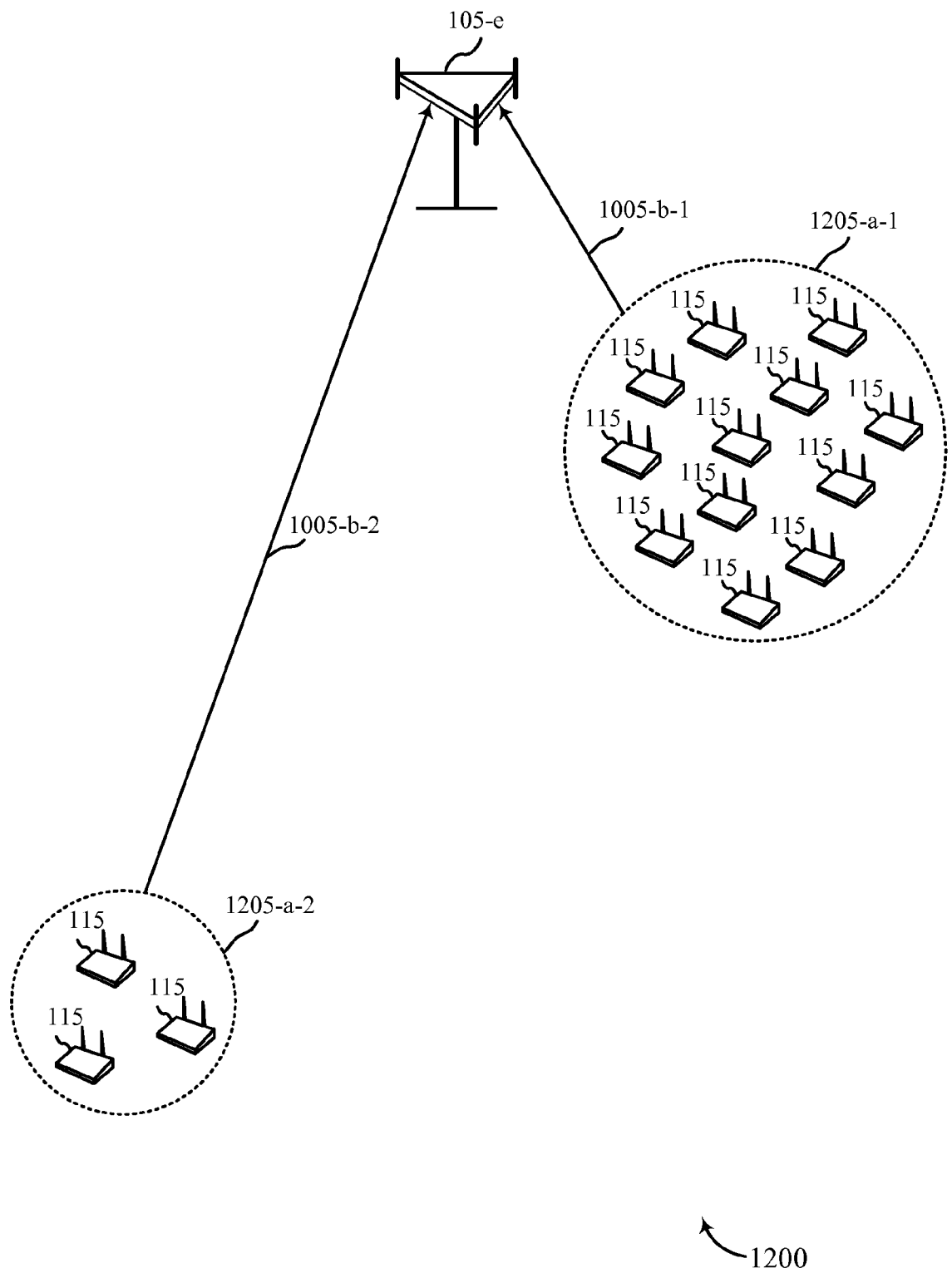
FIG. 12 is a block diagram illustrating one embodiment of a M2M wireless WAN in accordance with various embodiments of the present systems and methods.

FIG. 12 is a block diagram illustrating one embodiment of a M2M wireless WAN 1200 in accordance with various embodiments of the present systems and methods. In one example, a base station 105-*e* may communicate with one or more groups of M2M devices 1205. The base station 105-*e* may be an example of the base station shown in FIGS. 1, 2, 3A, 3B, 4A, 6, and/or 7. The one or more groups of M2M devices 1205 may include M2M devices 115 that are examples of devices 115 shown in FIGS. 1, 2, 3A, 3B, 5A, 8, and/or 9.

In one configuration, each group of the M2M devices may communicate with the base station 105-*e* via a frequency channel 1005-*b* on the reverse link. The frequency channels 1005-*b* may be examples of the frequency channels 1005 illustrated in FIGS. 10 and/or 11. In one embodiment, a first group 1205-*a*-1 of M2M devices 115 may transmit data packets to the base station 105-*e* using a first frequency channel 1005-*b*-1. A second group 1205-*a*-2 of M2M devices 115 may send data packet to the base station 105-*e* using a second frequency channel 1005-*b*-2.

In one configuration the RoT threshold set for each frequency channel 1005-*b* may be different. In one embodiment, the threshold set for the first channel 1005-*b*-1 may be higher than the threshold of the second channel 1005-*b*-2. As a result of the RoT thresholds, the capacity of the first channel 1005-*b*-1 may be higher than the capacity of the second channel 1005-*b*-2. In one example, the base station 105-*e* may dynamically change the threshold set for the first and/or second channel 1005-*b*. In one configuration, one or more M2M devices 115 in the first group 1205-*a*-1 may terminate their usage of the first frequency channel 1005-*b*-1. These devices may be removed from the group 1205-*a*-1, go offline, malfunction, etc. If the number of devices 115 using the first channel 1005-*b*-1 decreases, the level of interference on the channel will also decrease. As a result, the base station 105-*e* may reduce the RoT threshold.

As illustrated, the second group of M2M devices 1205-*a*-2 is located at a greater distance from the base station 105-*e* than the first group of M2M devices 1205-*a*-1. The second frequency channel 1005-*b*-2, with a lower RoT threshold, may be reserved for devices 115 that are located at a greater distance from the base station 105-*e*. The low RoT threshold may maintain a low interference level on the second channel 1005-*b*-2. In addition, the low threshold may cause the devices in the second group to transmit their data packets at a low data rate, while devices 115 in the first group 1205-a-1 may transmit at a higher data rate because of the higher RoT threshold of the first channel 1005-b-1.

In one embodiment, when an M2M device 115 is first introduced into the M2M wireless WAN, the base station 105-e or the device 115 itself may determine which channel the device 115 should use. For example, if an M2M device 115 comes online and is located in the area occupied by the second group 1205-a-2 of devices, the base station 105-e may assign the new device to the second frequency channel 1005-b-2. The base station 105-e may determine which channel to assign to the device based on reverse link signal strength received from the new M2M device 115. The device 115 may also be capable of determining which channel to use based on its forward link signal strength. In one embodiment, the new device 115 may use the strength of the forward link to determine whether it is located close to or far from the base station 105-e. In addition, the new device may estimate the level of congestion of the M2M wireless WAN and select the second channel 1005-b-2 with the lower RoT threshold if the estimated congestion is higher than a certain threshold. Further, the new device 115 may transmit a data packet at a high data rate using the first channel 1005-b-1. When the new device 115 does not receive an ACK message from the base station 105-e indicating the packet was successfully decoded and demodulated, the new M2M device 115 may switch from the first channel 1005-b-1 (with a high RoT) to use the second channel 1005-b-2 (with a lower RoT). The new device 115 may then transmit the packet on the second channel at a lower data rate.

Figure 13:
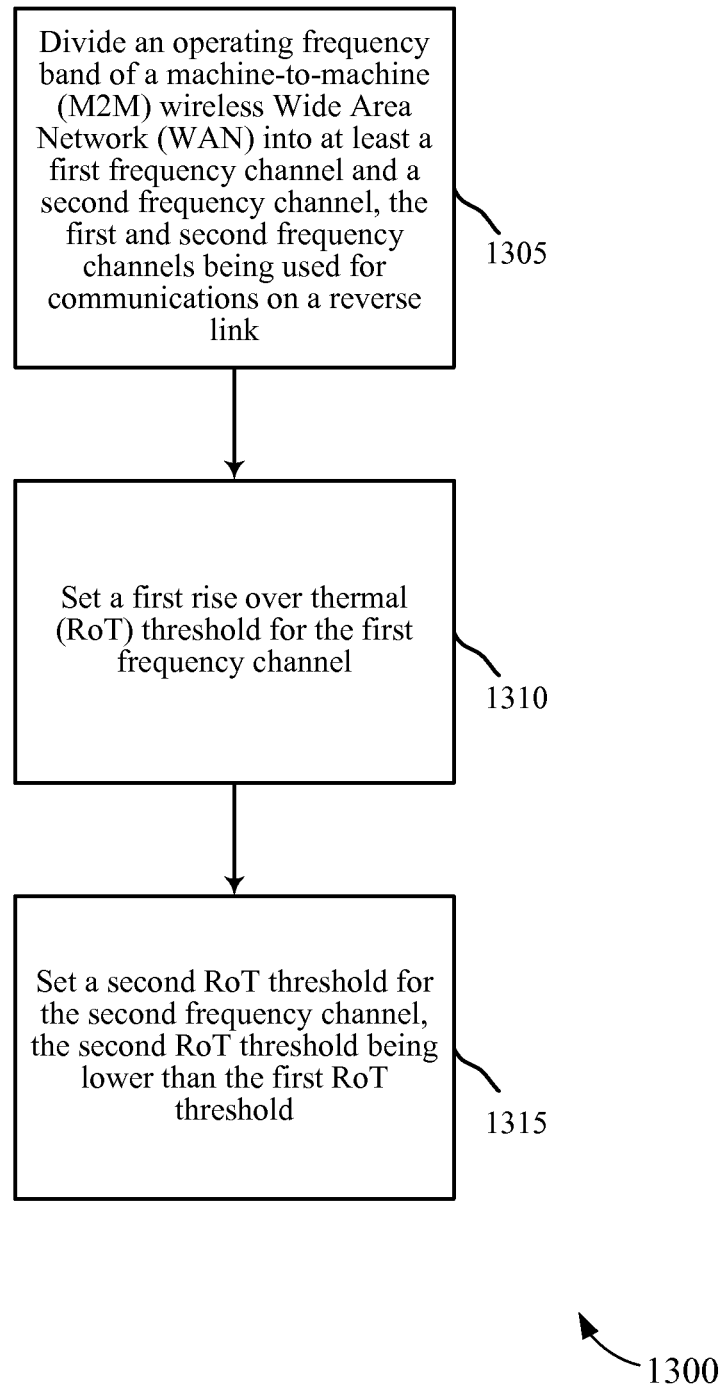
FIG. 13 is a flow chart illustrating one example of a method for conserving power of M2M devices by managing reverse link communications using a frequency channels with varying RoT thresholds.

FIG. 13 is a flow chart illustrating one example of a method 1300 for conserving power of M2M devices by managing reverse link communications using a frequency channels with varying RoT thresholds. For clarity, the method 1300 is described below with reference to the base station 105 shown in FIG. 1, 2, 3A, 3B, 4A, 6, or 7. In one implementation, the multi-channel module 455 may execute one or more sets of codes to control the functional elements of the base station 105 to perform the functions described below.

At block 1305, an operating frequency band of a M2M wireless WAN may be divided into at least a first frequency channel and a second frequency channel. In one example, the first and second frequency channels may be used for communications on a reverse link. At block 1310, a first RoT threshold may be set for the first frequency channel. At block 1315, a second RoT threshold may be set for the second frequency channel. The second RoT threshold may be lower than the first RoT threshold. In one configuration, the second frequency channel may be used by M2M devices in the wireless WAN that do not have sufficient signal strength with a base station. As a result, these devices are able to communication on the reverse link at less power (and a lower data rate) due to a lower RoT threshold being applied to the second frequency channel. Power may be conserved by these devices as they are not transmitting on a channel with a high interference level that requires additional power to transmit the data packets on the reverse link.

M2M devices, however, that have sufficient signal strength with the base station may use the first channel to transmit on the reverse link. These devices may transmit at a higher power due to the higher RoT threshold. Thus, they may also transmit their data packets on the reverse link at a higher data rate.

Therefore, the method 1300 may provide for efficient management of a power supply of M2M devices by managing communications on the reverse link. It should be noted that the method 1300 is just one implementation and that the operations of the method 1300 may be rearranged or otherwise modified such that other implementations are possible.

Figure 14:
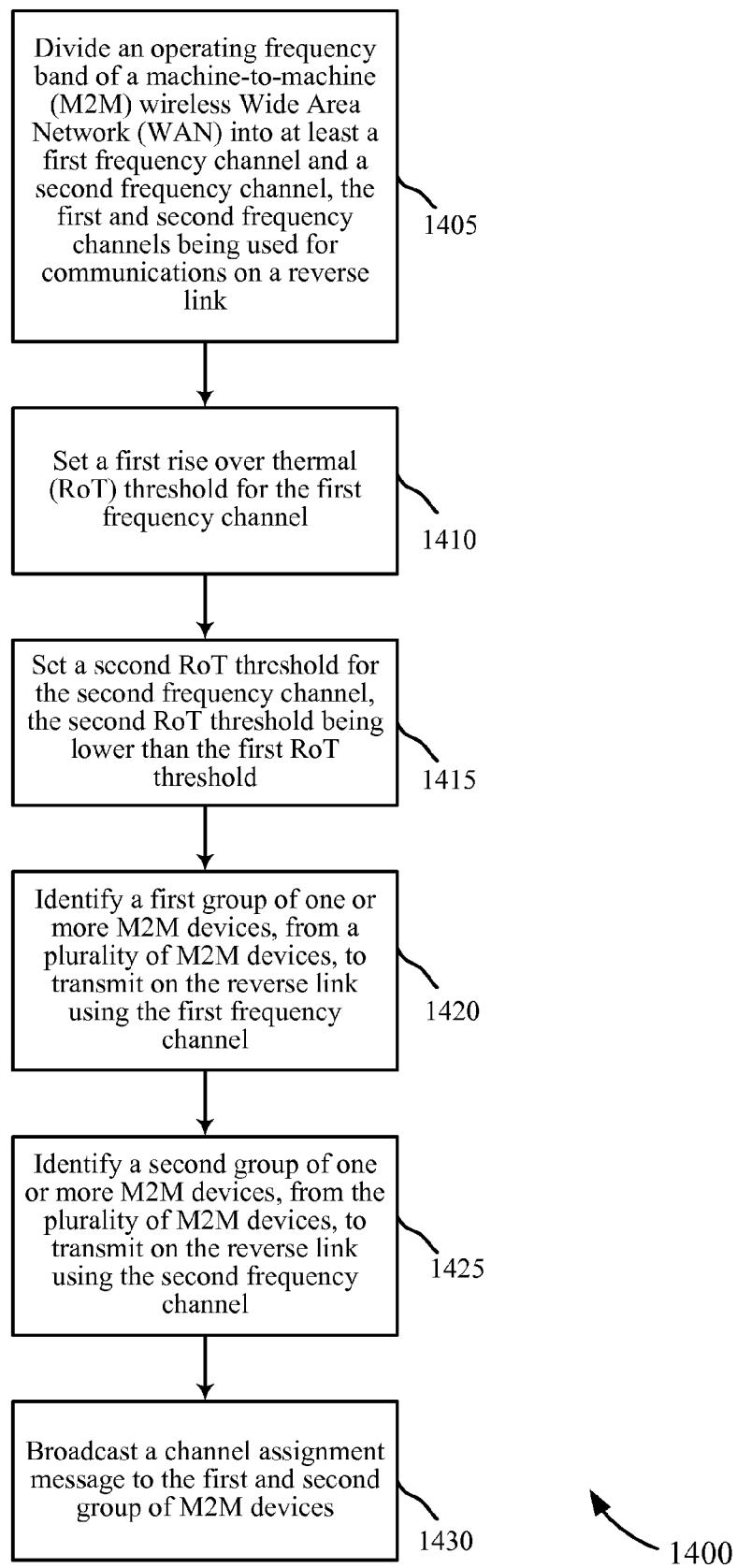
FIG. 14 is a flow chart illustrating one example of a method for conserving the power of M2M devices by assigning a channel with a low RoT threshold to devices that experience a large path loss with reserve link communications.

FIG. 14 is a flow chart illustrating one example of a method 1400 for conserving the power of M2M devices by assigning a channel with a low RoT threshold to devices that experience a large path loss with reserve link communications. For clarity, the method 1400 is described below with reference to the base station 105 shown in FIG. 1, 2, 3A, 3B, 4A, 6, or 7. In one implementation, the multi-channel module 455 may execute one or more sets of codes to control the functional elements of the base station 105 to perform the functions described below.

At block 1405, an operating frequency band of an M2M wireless WAN may be divided into at least a first frequency channel and a second frequency channel. The first and second frequency channels may be used for communications on a reverse link. At block 1410, a first RoT threshold may be set for the first frequency channel. At block 1415, a second RoT threshold may be set for the second frequency channel. The second RoT threshold may be lower than the first RoT threshold.

At block 1420, a first group of one or more M2M devices, from a plurality of M2M devices, may be identified to transmit on the reverse link using the first frequency channel. At block 1425, a second group of one or more M2M devices, from the plurality of devices, may be identified to transmit on the reverse link using the second frequency channel.

In one embodiment, identifying the first group of M2M devices may include identifying one or more M2M devices that are located in a first geographical location and identifying the second group of M2M devices may include identifying one or more devices located within a second geographical location. In one configuration, the first location may be in closer proximity to a base station than the second location. In one example, devices that are located in the first location may be identified as a member of the first group of M2M devices, while devices located in the second location may be part of the second group.

In one configuration, the groups of M2M devices may be identified by determining which M2M devices have previously transmitted on the reverse link at a data rate that satisfies a data rate threshold. Devices that have previously transmitted at a data rate that satisfies threshold may be identified as M2M devices of the first group. Devices that have not transmitted at the data rate threshold may be identified as the second group.

At block 1430, a channel assignment message to the first and second group of M2M devices. The message may include instructions to the M2M devices 115 indicating which channel they are to use to transmit on the reverse link. Devices 115 that are in the first group may be assigned to the first frequency channel with a higher RoT threshold, while devices 115 in the second group may be assigned to the second channel with a lower RoT threshold.

Therefore, the method 1400 may provide for saving power and other resources of M2M devices by identifying M2M devices that have a low signal strength with the base station based on their location and assigning a frequency channel to these devices 115 that has a low RoT threshold. It should be noted that the method 1400 is just one implementation and that the operations of the method 1400 may be rearranged or otherwise modified such that other implementations are possible.

Figure 15:
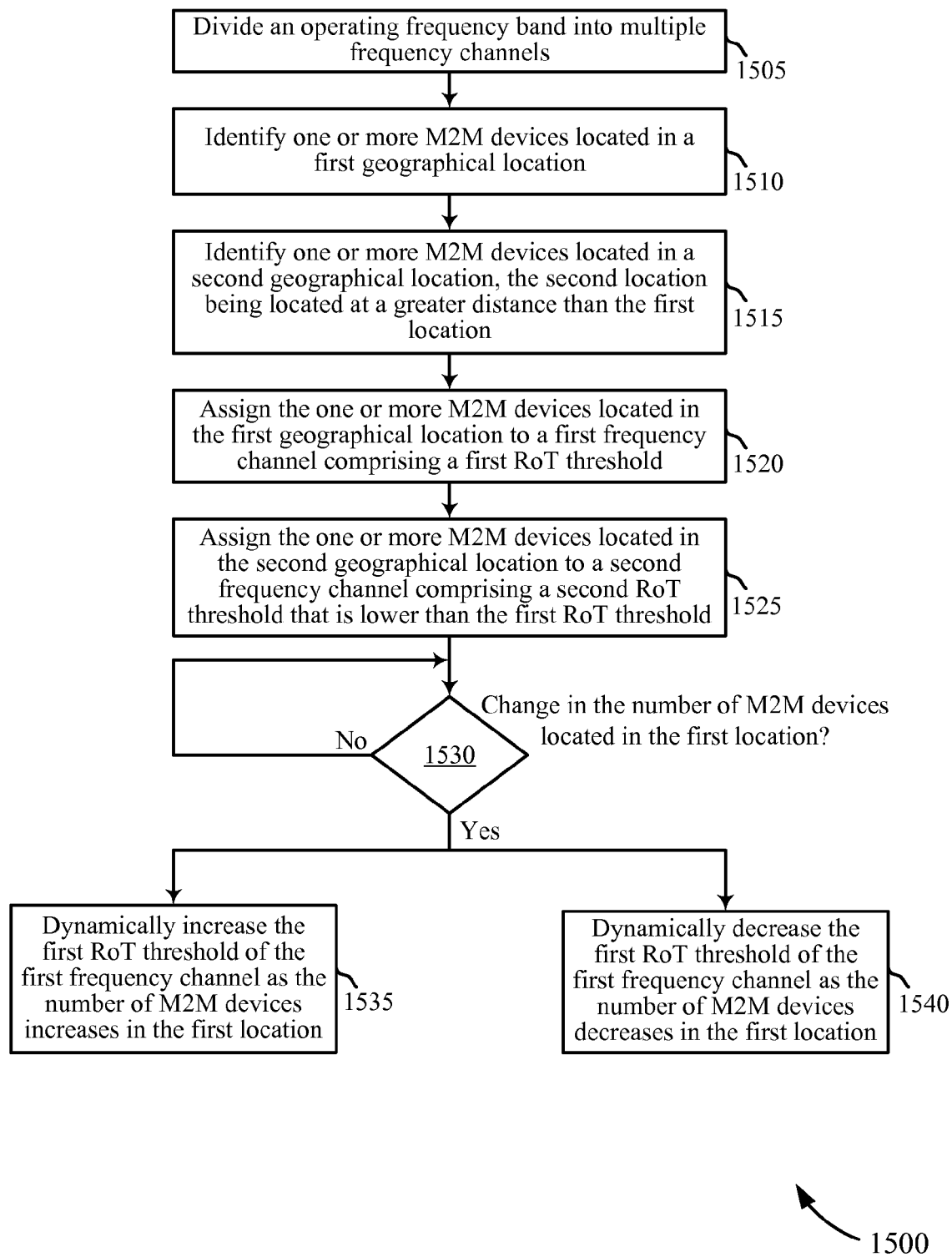
FIG. 15 is a flow chart illustrating one example of a method for managing a power supply of an M2M device by dynamically altering a RoT threshold of a frequency channel.

FIG. 15 is a flow chart illustrating one example of a method 1500 for managing a power supply of an M2M device by dynamically altering a RoT threshold of a frequency channel. For clarity, the method 1500 is described below with reference to the base station 105 shown in FIG. 1, 2, 3A, 3B, 4A, 6, or 7. In one implementation, the multi-channel module 455 may execute one or more sets of codes to control the functional elements of the base station 105 to perform the functions described below.

At block 1505, an operating frequency band may be divided into multiple frequency channels. The frequency channels may be CDMA channels. At block 1510, one or more M2M devices located in a first geographical location may be identified. At block 1515, one or more M2M devices located in a second geographical location may also be identified. In one configuration, the second location may be located at a greater distance than the first location from the base station 105.

At block 1520, the one or more M2M devices located in the first geographical location may be assigned to a first frequency channel. The first channel may include a first RoT threshold. At block 1525, the one or more M2M devices located in the second geographical location may be assigned to a second frequency channel. The second channel may include a second RoT threshold. In one configuration, the second RoT threshold may be lower then the first RoT threshold.

At block 1530, a determination may be made as to whether a change in the number of M2M devices located in the first location has changed. The number may change due to one or more M2M devices malfunctioning, being taken offline, being moved out of the first location, etc. If it is determined that no change has occurred, the method 1500 may continue to determine whether the number of devices in the first location has changed. If, however, it is determined that the number has changed, the first RoT threshold may dynamically increase as the number of M2M devices increases in the first location. Alternatively, the first RoT threshold may dynamically decrease at block 1540 as the number of M2M devices decreases in the first location. Thus, as the number of M2M devices using the first channel (with a high RoT threshold) decreases, the RoT threshold may also decrease because the interference signals on the first channel are also decreasing. A reduction in the first RoT threshold may result in the M2M devices 115 still using the first frequency channel to reduce the amount of power to transmit data packets on the reverse link.

Therefore, the method 1500 may provide for efficient management of power of the M2M device 115 by dynamically altering RoT thresholds of frequency channels. It should be noted that the method 1500 is just one implementation and that the operations of the method 1500 may be rearranged or otherwise modified such that other implementations are possible.

Figure 16:
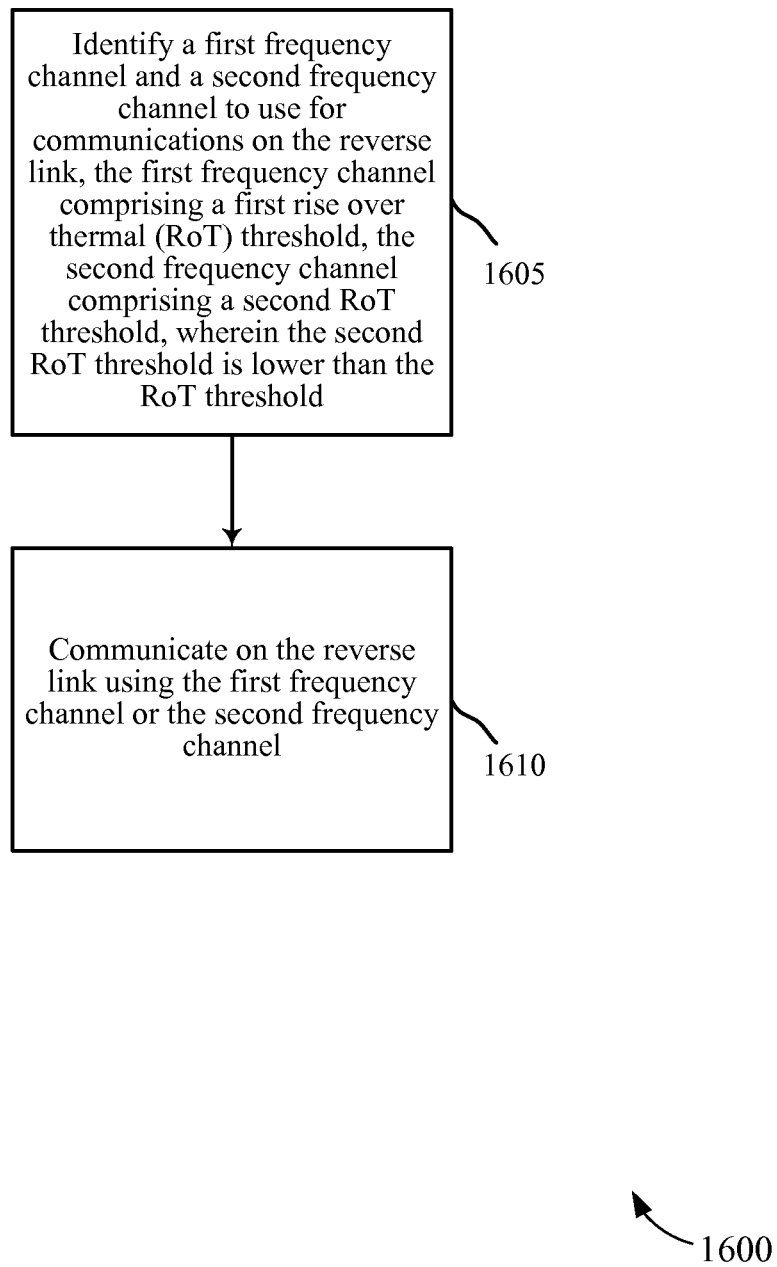
FIG. 16 is a flow chart illustrating one example of a method for managing power of an M2M device by selecting a frequency channel to use based on the RoT threshold of the channel.

FIG. 16 is a flow chart illustrating one example of a method 1600 for managing power of an M2M device by selecting a frequency channel to use based on the RoT threshold of the channel. For clarity, the method 1600 is described below with reference to the M2M device 115 shown in FIG. 1, 2, 3A, 3B, 5A, 8, or 9. In one implementation, the channel identifying module 525 may execute one or more sets of codes to control the functional elements of the base station 105 to perform the functions described below.

At block 1605, a first frequency channel and a second frequency channel may be identified to use for communications on the reverse link. The first frequency channel may include a first RoT threshold. The second frequency channel may include a second RoT threshold. In one configuration, the second RoT threshold may be lower than the first RoT threshold. At block 1610, communications may occur on the reverse link using the first frequency channel or the second frequency channel. The channel used for the communications may depend on the RoT level set for the channel.

Therefore, the method 1600 may provide for efficient management of power of the M2M device 115 by using a frequency channel based on the RoT threshold of that channel. It should be noted that the method 1600 is just one implementation and that the operations of the method 1600 may be rearranged or otherwise modified such that other implementations are possible.

Figure 17:
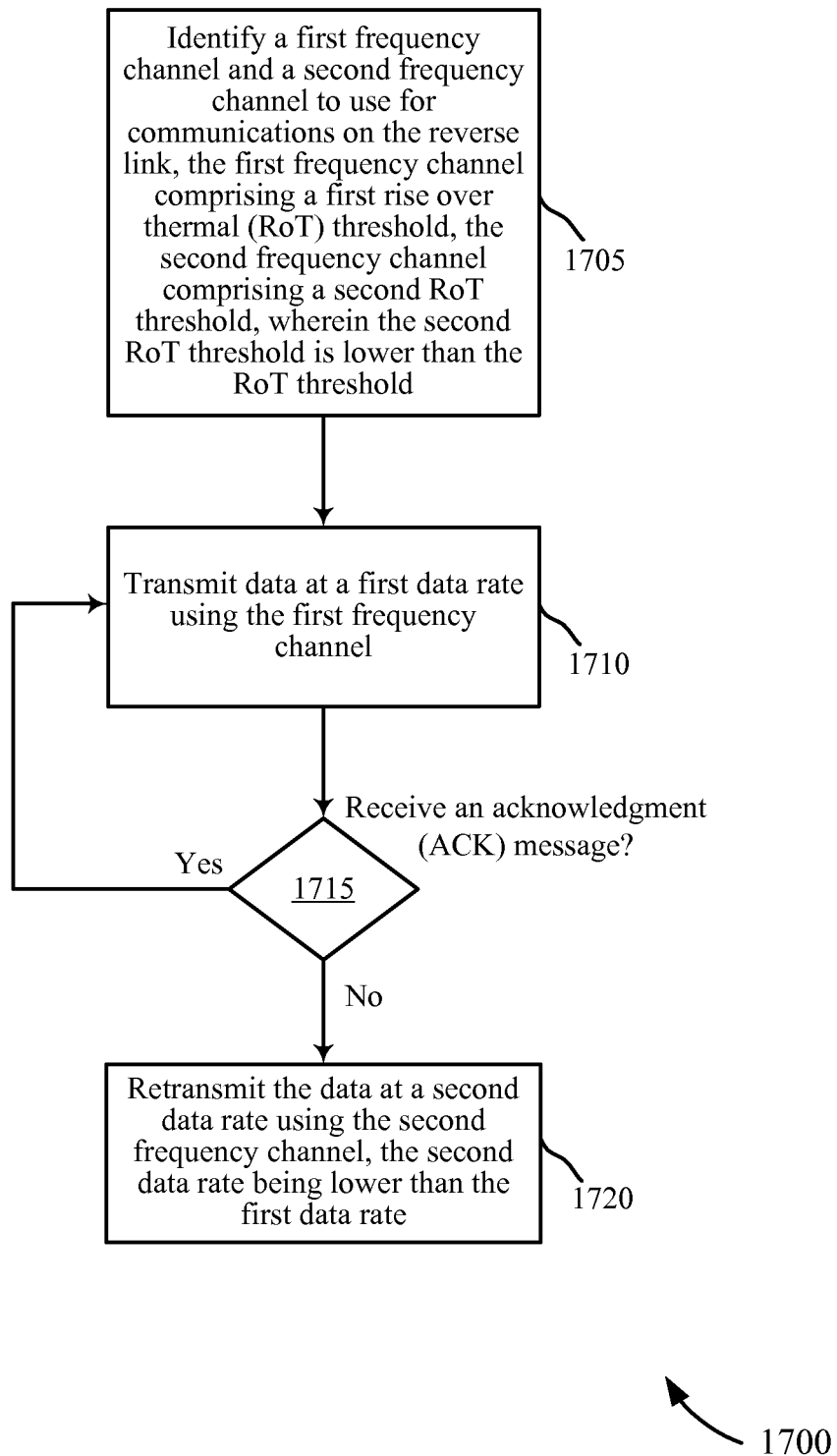
FIG. 17 is a flow chart illustrating one example of a method for managing power of an M2M device by selecting a frequency channel to use based on the RoT threshold of the channel based on a data rate used to transmit on the reverse link.

FIG. 17 is a flow chart illustrating one example of a method 1700 for managing power of an M2M device by selecting a frequency channel to use based on the RoT threshold of the channel based on a data rate used to transmit on the reverse link. For clarity, the method 1700 is described below with reference to the M2M device 115 shown in FIG. 1, 2, 3A, 3B, 5A, 8, or 9. In one implementation, the channel identifying module 525 may execute one or more sets of codes to control the functional elements of the base station 105 to perform the functions described below.

At block 1705, a first frequency channel and a second frequency channel may be identified to use for communications on the reverse link. The first frequency channel may include a first RoT threshold. The second frequency channel may include a second RoT threshold. In one configuration, the second RoT threshold may be lower than the first RoT threshold. At block 1710, data may be transmitted at a first data rate using the first frequency channel. At block 1715 a determination may be made as to whether an ACK message is received on the forward link. The ACK message may indicate that the data was decoded and demodulated by the base station. If it is determined that the ACK message was received, data may continue to be transmitted at the first data rate using the first frequency channel with the higher RoT threshold.

If, however, it is determined that the ACK message is not received, the data may be retransmitted at a second data rate using the second frequency channel at block 1720. In one embodiment, the second data rate may be lower than the first data rate.

Therefore, the method 1700 may provide for efficient management of power of the M2M device 115 by using a frequency channel based on the RoT threshold of that channel and transmitting data packets at a certain data rate. It should be noted that the method 1700 is just one implementation and that the operations of the method 1700 may be rearranged or otherwise modified such that other implementations are possible.

Techniques described herein may be used for various wireless communications systems such as M2M systems, cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies for multiple access in a wireless system such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication in a machine-to-machine (M2M) wireless Wide Area Network (WAN), comprising:
   dividing an operating frequency band of the M2M wireless WAN into at least a first frequency channel and a second frequency channel, the first and second frequency channels being used for communications on a reverse link;
   broadcasting a channel assignment message to a first group of one or more M2M devices and a second group of one or more M2M devices, the channel assignment message informing the first group of one or more M2M devices to transmit on the reverse link using the first frequency channel, and the channel assignment message informing the second group of one or more M2M devices to transmit on the reverse link using the second frequency channel;
   setting a first rise over thermal (RoT) threshold for the first frequency channel; and
   setting a second RoT threshold for the second frequency channel, the second RoT threshold being lower than the first RoT threshold.

2. The method of claim 1, further comprising:
   identifying the first group of one or more M2M devices, from a plurality of M2M devices, to transmit on the reverse link using the first frequency channel; and
   identifying the second group of one or more M2M devices, from the plurality of M2M devices, to transmit on the reverse link using the second frequency channel.

3. The method of claim 2, wherein identifying the first group and second group of one or more M2M devices comprises:
   identifying one or more M2M devices, from the plurality of M2M devices, located within a first geographical area; and
   identifying one or more M2M devices, from the plurality of M2M devices, located within a second geographical area.

4. The method of claim 3, further comprising:
   assigning the one or more M2M devices located within the first geographical area to the first frequency channel with the first RoT threshold; and
   assigning the one or more M2M devices located within the second geographical area to the second frequency channel with the second RoT threshold, the second geographical area having a greater path loss from a device communicating with the one or more M2M devices on a forward link than the first geographical area.

5. The method of claim 2, wherein identifying the first group and second group of one or more M2M devices comprises:
identifying one or more M2M devices, from the plurality of M2M devices, that have previously transmitted on the reverse link at a data rate that satisfies a data rate threshold; and
identifying one or more M2M devices, from the plurality of M2M devices, that have previously transmitted on the reverse link at a data rate that fails to satisfy the data rate threshold.

6. The method of claim 5, further comprising:
assigning the one or more M2M devices that have previously transmitted on the reverse link at the data rate that satisfies the data rate threshold to the first frequency channel with the first RoT threshold; and
assigning the one or more M2M devices that have previously transmitted on the reverse link at the data rate that fails to satisfy the data rate threshold to the second frequency channel with the second RoT threshold.

7. The method of claim 2, wherein identifying the first group and second group of one or more M2M devices comprises:
estimating a strength of a forward link received at one or more of the M2M devices of the plurality of M2M device.

8. The method of claim 7, further comprising:
assigning the first group of one or more M2M devices to the first frequency channel with the first RoT threshold; and
assigning the second group of one or more M2M devices to the second frequency channel with the second RoT threshold, the estimated strength of the forward link received at the second group being lower than the estimated strength of the forward link received at the first group.

9. The method of claim 1, further comprising:
determining whether to adjust the first or second RoT thresholds for the first or second frequency channels.

10. The method of claim 9, wherein the determination to adjust the first or second RoT thresholds is based at least in part on a change of a number of M2M devices using the first or second frequency channels to communicate on the reverse link.

11. The method of claim 10, further comprising:
dynamically lowering the first RoT threshold of the first frequency channel upon determining the number of M2M devices using the first frequency channel has decreased.

12. The method of claim 10, further comprising:
dynamically increasing the first RoT threshold of the first frequency channel upon determining the number of M2M devices using the first frequency channel has increased.

13. The method of claim 1, further comprising:
implementing code division multiple access (CDMA) for communications on the reverse link using the first and second frequency channels.

14. The method of claim 1, wherein a RoT threshold represents a quantity of signal interference on a frequency channel that is above a thermal noise of the frequency channel.

15. A base station configured for wireless communication in a machine-to-machine (M2M) wireless Wide Area Network (WAN), comprising:
a processor;
memory in electronic communication with the processor; and
instructions being stored in the memory, the instructions being executable by the processor to:
divide an operating frequency band of the M2M wireless WAN into at least a first frequency channel and a second frequency channel, the first and second frequency channels being used for communications on a reverse link;
broadcast a channel assignment message to a first group of one or more M2M devices and a second group of one or more M2M devices, the channel assignment message informing the first group of one or more M2M devices to transmit on the reverse link using the first frequency channel, and the channel assignment message informing the second group of one or more M2M devices to transmit on the reverse link using the second frequency channel;
set a first rise over thermal (RoT) threshold for the first frequency channel; and
set a second RoT threshold for the second frequency channel, the second RoT threshold being lower than the first RoT threshold.

16. The base station of claim 15, wherein the instructions are further executable by the processor to:
determine whether to adjust the first or second RoT thresholds for the first or second frequency channels.

17. The base station of claim 16, wherein the determination to adjust the first or second RoT thresholds is based at least in part on a change of a number of M2M devices using the first or second frequency channels to communicate on the reverse link.

18. The base station of claim 17, wherein the instructions are further executable by the processor to:
dynamically lower the first RoT threshold of the first frequency channel upon determining the number of M2M devices using the first frequency channel has decreased.

19. The base station of claim 17, wherein the instructions are further executable by the processor to:
dynamically increase the first RoT threshold of the first frequency channel upon determining the number of M2M devices using the first frequency channel has increased.

20. The base station of claim 15, wherein the instructions are further executable by the processor to:
implement code division multiple access (CDMA) for communications on the reverse link using the first and second frequency channels.

21. The base station of claim 15, wherein a RoT threshold represents a quantity of signal interference on a frequency channel that is above a thermal noise of the frequency channel.

22. An apparatus configured for wireless communication in a machine-to-machine (M2M) wireless Wide Area Network (WAN), comprising a memory and a processor configured to:
divide an operating frequency band of the M2M wireless WAN into at least a first frequency channel and a second frequency channel, the first and second frequency channels being used for communications on a reverse link;
broadcast a channel assignment message to a first group of one or more M2M devices and a second group of one or more M2M devices, the channel assignment message informing the first group of one or more M2M devices to transmit on the reverse link using the first frequency channel, and the channel assignment message informing the second group of one or more M2M devices to transmit on the reverse link using the second frequency channel;

set a first rise over thermal (RoT) threshold for the first frequency channel; and set a second RoT threshold for the second frequency channel, the second RoT threshold being lower than the first RoT threshold.

23. The apparatus of claim 22, wherein the processor is further configured to:

determine whether to adjust the first or second RoT thresholds for the first or second frequency channels.

24. The apparatus of claim 23, wherein the determination to adjust the first or second RoT thresholds is based at least in part on a change of a number of M2M devices using the first or second frequency channels to communicate on the reverse link.

25. The apparatus of claim 24, wherein the processor is further configured to:

dynamically lowering dynamically lower the first RoT threshold of the first frequency channel upon determining the number of M2M devices using the first frequency channel has decreased.

26. The apparatus of claim 24, wherein the processor is further configured to:

dynamically increase the first RoT threshold of the first frequency channel upon determining the number of M2M devices using the first frequency channel has increased.

27. A computer program product for managing wireless communication in a machine-to-machine (M2M) wireless Wide Area Network (WAN), the computer program product comprising a non-transitory computer-readable medium storing instructions executable by a processor to:

divide an operating frequency band of the M2M wireless WAN into at least a firs frequency channel and a second frequency channel, the first and second frequency channels being used for communications on a reverse link;

broadcast a channel assignment message to a first group of one or more M2M devices and a second group of one or more M2M devices, the channel assignment message informing the first group of one or more M2M devices to transmit on the reverse link using the first frequency channel, and the channel assignment message informing the second group of one or more M2M devices to transmit on the reverse link using the second frequency channel;

set a first rise over thermal (RoT) threshold for the first frequency channel; and set a second RoT threshold for the second frequency channel, the second RoT threshold being lower than the first RoT threshold.

28. The computer program product of claim 27, wherein the instructions are further executable by the processor to:

determine whether to adjust the first or second RoT thresholds for the first or second frequency channels.

29. The computer program product of claim 28, wherein the determination to adjust the first or second RoT thresholds is based at least in part on a change of a number of M2M devices using the first or second frequency channels to communicate on the reverse link.

30. The computer program product of claim 29, wherein the instructions are further executable by the processor to:

dynamically lower the first RoT threshold of the first frequency channel upon determining the number of M2M devices using the first frequency channel has decreased.

31. The computer program product of claim 29, wherein the instructions are further executable by the processor to:

dynamically increase the first RoT threshold of the first frequency channel upon determining the number of M2M devices using the first frequency channel has increased.

* * * * *